(12) United States Patent
Nako

(10) Patent No.: US 8,059,313 B2
(45) Date of Patent: Nov. 15, 2011

(54) IMAGE FORMING APPARATUS AND METHOD FORMING A LATENT IMAGE FOR EMBEDDING INFORMATION IN AN IMAGE

(75) Inventor: Kazuyuki Nako, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1227 days.

(21) Appl. No.: 11/476,149

(22) Filed: Jun. 28, 2006

(65) Prior Publication Data

US 2007/0002378 A1    Jan. 4, 2007

(30) Foreign Application Priority Data

Jun. 30, 2005 (JP) ................................. 2005-191028

(51) Int. Cl.
*H04N 1/40* (2006.01)
(52) U.S. Cl. ........ 358/3.28; 358/1.9; 358/1.18; 382/274
(58) Field of Classification Search ............... 358/3.28, 358/1.18, 1.9; 382/274
See application file for complete search history.

(56) References Cited

U.S. PATENT DOCUMENTS

| | | | | |
|---|---|---|---|---|
| 6,975,431 B1 * | 12/2005 | Sugizaki | ............... | 358/3.06 |
| 7,085,399 B2 * | 8/2006 | Suzaki | ................. | 382/100 |
| 7,352,879 B2 * | 4/2008 | Wang | ................... | 382/100 |
| 7,359,087 B2 * | 4/2008 | Tanaka | ................ | 358/1.9 |
| 2003/0043390 A1 * | 3/2003 | Fritz et al. | ............ | 358/1.9 |
| 2003/0076540 A1 | 4/2003 | Hamashima et al. | | |
| 2004/0252347 A1 * | 12/2004 | Hosoya et al. | ........ | 358/3.28 |
| 2005/0174596 A1 * | 8/2005 | Uchida et al. | ........ | 358/1.14 |
| 2006/0209348 A1 * | 9/2006 | Tabata | ............... | 358/3.28 |

FOREIGN PATENT DOCUMENTS

| | | |
|---|---|---|
| CN | 1412005 A | 4/2003 |
| JP | 54-74125 | 6/1979 |
| JP | 04-170569 | 6/1992 |
| JP | 4-372075 A | 12/1992 |
| JP | 6-339037 A | 12/1994 |
| JP | 07-231384 | 8/1995 |
| JP | 9-179494 A | 7/1997 |
| JP | 2000-134450 A | 5/2000 |
| JP | 2000-224410 A | 8/2000 |
| JP | 2000-232581 A | 8/2000 |
| JP | 2000-348211 A | 12/2000 |
| JP | 2001-197297 A | 7/2001 |
| JP | 2002-305646 A | 10/2002 |
| JP | 2003-101762 | 4/2003 |
| JP | 2005-122361 A | 5/2005 |

* cited by examiner

*Primary Examiner* — Sudhanshu Pathak
*Assistant Examiner* — Benjamin O Dulaney
(74) *Attorney, Agent, or Firm* — Nixon & Vanderhye P.C.

(57) ABSTRACT

A pattern producing unit performs arithmetic on values of pixels corresponding to a pattern and a basic pattern read from a data storing unit with an AND operation unit, and thereby produces a pattern having substantially the same shade level as the pattern. The latent-image-containing image producing unit produces the latent-image-containing image by selectively combining the pattern and the produced pattern according to the values of respective pixels of mask image data read from the data storing unit for producing a latent image.

4 Claims, 21 Drawing Sheets

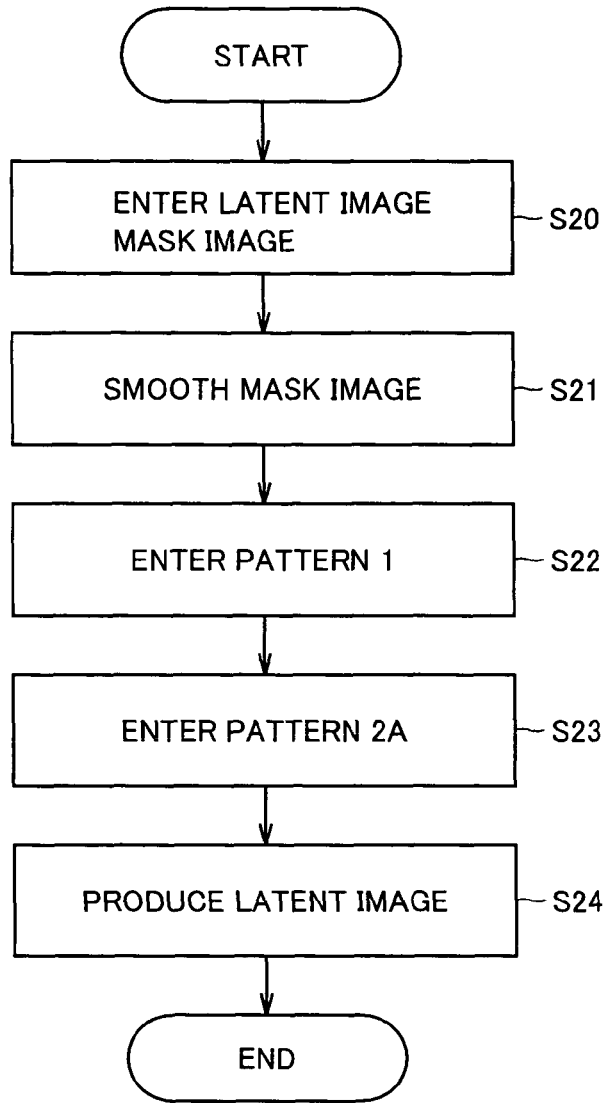

| 1/16 | 12/16 | 6/16 | 5/16 | — D |
|------|-------|------|------|-----|
| 14/16 | 10/16 | 2/16 | 13/16 | |
| 3/16 | 15/16 | 7/16 | 4/16 | |
| 9/16 | 16/16 | 11/16 | 8/16 | |

21

IMAGE FORMING APPARATUS AND METHOD FORMING A LATENT IMAGE FOR EMBEDDING INFORMATION IN AN IMAGE

This nonprovisional application is based on Japanese Patent Application No. 2005-191028 filed with the Japan Patent Office on Jun. 30, 2005, the entire contents of which are hereby incorporated by reference.

BACKGROUND

1. Field of the Technology

The technology presented herein relates to an image processing apparatus and a method, and particularly to an image forming apparatus and a method forming a latent image for embedding information in an image.

2. Background Art

Since copy machine technologies have been developed in recent years, it is now possible to copy or counterfeit documents without difficulty and this has become a significant social issue. Therefore, a latent image printing technique has been proposed as one of techniques that reveal a latent image when copied so that one can identify a reproduction at a first glance.

Japanese Patent Laying-Open No. 54-074125 provides a printed matter in which a latent image is printed in fine dots (i.e., halftone dots), and a portion around the latent image is printed in coarse dots. Since fine dots are hard to copy, and one can easily recognize the latent image when the printed matter is copied. The technique in Japanese Patent Laying-Open No. 54-074125 utilizes a limit of a reproduction performance of a copying machine. For example, sheets of paper employing a similar technique are used for copies of certificates of residence so that letters of "COPY" or the like may appear when the certificate of residence is copied.

Description will now be given on a latent image with reference to FIGS. 23 and 24. FIG. 23 shows an example of the latent image. In FIG. 23, an image of a letter "A" serving as a latent image is formed of a coarse pattern 21, and a peripheral image is formed of a fine pattern 22 to exhibit the same shade level as the latent image. When a copying machine copies a sheet on which the image of FIG. 23 is printed, a copied matter in FIG. 24 is produced. On the copied matter in FIG. 24, fine pattern 22 is not present, or a shade difference is present between coarse and fine patterns 21 and 22 due to a performance limit of the copying machine so that a letter of "A" embedded as the latent image appears.

Referring to FIGS. 25A-25D, description will now be given on the case where the latent image technique is utilized on sheets for printing an original. An original image shown in FIG. 25A is printed on a sheet bearing a background image containing a latent image (i.e., an image of a letter "A") shown in FIG. 25B. FIG. 25C shows a result of such printing. On a printed matter in FIG. 25C, the latent image is integral with a background around it, and the background image exhibits a uniform pattern so that a person viewing the printed matter in FIG. 25C considers that the original is printed on a uniform pattern. When the printed matter in FIG. 25C is copied, the latent image appears on the copied matter as already described. Therefore, by employing an image of letters of "COPY" as the latent image, one can easily determine whether the printed matter was produced by copying or not.

However, according to the technique in Japanese Patent Laying-Open No. 54-074125, it is necessary to prepare sheets having a latent image effect before printing the documents in view of an estimated volume of required sheets. When a design of the latent image is changed, new sheets of paper must be prepared, which results in a waste of the printed sheets, and excessively increases a cost. Further, it is impossible to change the letters to be embedded in response to every printing of the document.

Japanese Patent Laying-Open No. 07-231384 has disclosed a technique in which a digital copying machine records a background image containing a latent image in addition to an original image read by a CCD (Charge Coupled Device). The digital copying machine performs internal image processing to overlay the background image containing the latent image on the original image so that it is not necessary to prepare in advance the printed sheets bearing the background image containing the latent image.

Referring to FIGS. 25A-25D, description will now be given on overlaying of the original image and the background image containing the latent image. In the technique of Japanese Patent Laying-Open No. 54-074125, it is necessary to print in advance the background image containing the latent image on sheets of paper. However, according to the technique of Japanese Patent Laying-Open No. 07-231384, the image processing is performed to overlay the original image (see FIG. 25A) on the background image (see FIG. 25B) containing the latent image, and thereby the print output of the image in FIG. 25C is performed so that it is not necessary to prepare in advance the sheets bearing the background image containing the latent image.

The techniques disclosed in Japanese Patent Laying-Open Nos. 54-074125 and 07-231384 utilize the coarse and fine patterns that exhibit the same shade level to the eye. Therefore, the patterns are uniform at a distant view, but a boundary between the coarse and fine patterns becomes conspicuous in a close view, and such a problem occurs that the latent image is readily recognized with the naked eye even when it is not copied.

Accordingly, a technique has been disclosed in Japanese Patent Laying-Open No. 04-170569 for providing a camouflage pattern of an open or hollow form that is independent of a latent image pattern and extends through a background image and the latent image. Since the camouflage pattern is more conspicuous than the boundary between the coarse and fine patterns, it is difficult to recognize the latent image with the naked eye. Further, as compared with the technique of overprinting another pattern, this technique can camouflage the latent image with less cost and time.

Referring to FIGS. 23, 26 and 27, description will now be given on the camouflage pattern. Referring to FIG. 23, coarse pattern 21 and dense (fine) pattern 22 are printed to exhibit the same shade level, and therefore can be recognized as a uniform pattern in a distant view, but a boundary between the coarse and fine patterns becomes conspicuous in a close view due to a difference in density so that the latent image is recognized with the naked eye. In view of this, as shown in FIG. 26, a hollow camouflage pattern 23 is arranged over patterns 21 and 22. Since the camouflage pattern is more conspicuous than the pattern boundary, the latent image can be camouflaged. When the background image containing the latent image thus camouflaged with the pattern is copied, such an effect is ensured that the fine pattern is not copied similarly to the case where the camouflage pattern is not employed, and the latent image appears as shown in FIG. 27

Japanese Patent Laying-Open No. 2003-101762 has disclosed a technique in which one symbol is assigned to one dot pattern, and dot patterns are arranged in combination for embedding information in an image. The dot patterns will now be described with reference to FIGS. 28A, 28B and 29. For example, the dot pattern in FIG. 28A is assigned a symbol of 0, and the dot pattern in FIG. 28B is assigned a symbol of 1. These symbols are combined, and the dot patterns in FIG. 28A or 28B are arranged according to the arrangement or alignment of the combined symbols so that a uniform background pattern 30 can be formed as shown in FIG. 29. Therefore, by combining it with the techniques in Japanese Patent Laying-Open Nos. 54-074125 and 07-231384, a part of the background pattern may be replaced with another pattern that exhibits the same shade level, and thereby it is possible to provide the background image containing the latent image that appears when copied.

However, one can easily recognize a boundary portion between the dot pattern bearing the symbols and the replaced pattern similarly to Japanese Patent Laying-Open Nos. 54-074125 and 07-231384, and a problem that the latent image is visible to the naked eye is not yet overcome. In particular, the pattern formed of arrangement of the dot patterns bearing the symbols exhibits a peculiar pattern, and thus the peculiar pattern becomes more conspicuous.

The camouflage pattern of the Japanese Patent Laying-Open No. 04-170569 may be used for overcoming the problem that the latent image is visible to the naked eye. In this case, the latent image is not conspicuous to the eye, but such a problem arises that the camouflage pattern destroys the dot pattern, and information embedded in the image cannot be read.

As described above, when information is embedded in at least one of the plurality of patterns forming the latent image, a mere combination of the foregoing patent references cannot camouflage the latent image to make it inconspicuous without losing the embedded information.

SUMMARY

Accordingly, a feature of an example embodiment presented herein is to provide an image processing apparatus and a method that produce an image containing a latent image in an inconspicuous fashion.

Another feature is to provide an image processing apparatus and a method that produce an image containing a latent image in an inconspicuous fashion even when information is embedded in a pattern forming the latent image.

For achieving the above feature, an aspect of the example embodiment provides an image processing apparatus for producing an image containing a latent image by combining different kinds of pattern images, including a pattern producing unit producing, based on a provided first pattern image, a second pattern image having substantially the same shade level as the first pattern image; and a latent image producing unit producing an image containing a latent image by selectively combining the first pattern image and the produced second pattern image according to values of respective pixels of a mask image provided for producing the latent image.

Preferably, the first pattern image is formed of a plurality of information patterns bearing different items of assigned information in an embedded fashion.

Thereby, the second pattern image having the same shade level as the first pattern image is produced based on the first pattern image, and the image containing the latent image is produced by selectively combining the first pattern image and the produced second pattern image according to the mask image employed for the latent image.

Accordingly, the image containing the latent image is viewed as an image having a uniform shade level so that it is possible to provide the latent image that is hard to recognize by the naked eye. Consequently, even when the information is embedded in the first pattern image, the information can be concealed. Therefore, it becomes unnecessary to provide a camouflage pattern over the image containing the latent image for concealing the information, and such a situation can be avoided that the information embedded in the first pattern is lost due to the camouflage pattern.

Preferably, the apparatus further includes an image expanding unit effecting expansion processing on the provided first pattern image, and providing the first pattern image subjected to the expansion processing to the pattern producing unit.

Accordingly, the first pattern image is used for producing the second pattern image after it undergoes the expansion processing. Accordingly, the expansion processing removes a local feature in the first pattern image, and leaves only a major feature so that the second pattern image can have substantially the same pattern as the first pattern image.

Preferably, the different kinds of pattern images exhibit the same shade level when viewed.

Preferably, the pattern producing unit converts a basic pattern to the second pattern by replacing a value of each of pixels of the basic pattern image prepared in advance with a value of a logical product between the value of the pixel and a value of the corresponding pixel of the first pattern image.

Accordingly, the second pattern image can be readily produced using the logical operation.

According to another feature of an example embodiment, an image processing apparatus for producing an image containing a latent image by combining different kinds of pattern images includes an image smoothing unit effecting smoothing processing on a provided mask image; and a latent image producing unit producing the latent-image containing image by combining first and second pattern images having substantially the same shade level at a mixing ratio according to an output of the image smoothing unit.

Thereby, in the latent-image-containing image produced based on the mask image by using the first and second pattern images having substantially the same shade level, a smooth change occurs in shade level of a boundary portion between the latent image and the peripheral image. Consequently, it is possible to provide the latent image that is hard to recognize by the naked eye. Particularly, when information is embedded in the first pattern image, it is not necessary to provide a camouflage pattern over the first-pattern image, and such a situation can be avoided that the camouflage pattern causes loss of the information.

Preferably, the apparatus further includes a pattern producing unit producing the second pattern image having substantially the same shade level as the provided first pattern image based on the first pattern image.

Preferably, the first pattern image is formed of a plurality of information patterns bearing different items of assigned information, respectively.

Preferably, the apparatus further includes an image expanding unit effecting expansion processing on the provided first pattern image, and providing the first pattern image subjected to the expansion processing to the pattern producing unit.

Preferably, the latent image producing unit replaces a value of each of pixels of an image to be the image containing the latent image with a result of addition of corresponding pixel values of the first and second pattern images performed according to a ratio based on the value of the corresponding pixel of the smoothed mask image provided from the image smoothing unit.

For achieving the above feature, still another aspect of the example embodiment provides an image forming apparatus for producing an image containing a latent image by combining different kinds of pattern images, including a contour dot-conversion unit converting a contour portion of a provided mask image to dots; and a latent image producing unit producing the image containing the latent image by selectively combining first and second pattern images having substantially the same shade level according to a value of each of pixels of the mask image having the contour portion subjected to the dot conversion by the contour dot-conversion unit.

Accordingly, in the latent-image-containing image produced based on the mask image by using the first and second pattern images having substantially the same shade level, a smooth change occurs in shade level of a boundary portion between the latent image and the peripheral image. Consequently, it is possible to provide the latent image that is hard to recognize by the naked eye. When information is embedded in the first pattern image, it is not necessary to provide a camouflage pattern over the first pattern image for concealing the image, and thus such a situation can be prevented that the camouflage pattern causes loss of the information. Further, since the latent image can be produced merely by selectively combining the first and second pattern images, fast processing can be performed.

Preferably, the apparatus further includes a pattern producing unit producing the second pattern image having substantially the same shade level as the first pattern image based on the provided first pattern image.

Preferably, the first pattern image is formed of a plurality of information patterns bearing different items of assigned information, respectively.

Preferably, the apparatus further includes an image expanding unit effecting expansion processing on the provided first pattern image, and providing the first pattern image subjected to the expansion processing to the pattern producing unit.

Preferably, the contour dot-conversion unit processes the contour portion such that a dot density decreases as the position moves toward an outer side of the mask image.

Preferably, the contour dot-conversion unit randomly removes the dots in the contour portion.

Preferably the contour dot-conversion unit uniformly removes the dots in the contour portion.

Preferably, the apparatus further includes an image expanding unit effecting expansion processing on the provided mask image, and providing the mask image subjected to the expansion processing to the contour dot-conversion unit. The number of pixels expanded by the image expanding unit and a rate of the dot conversion in the contour portion caused by the contour dot-conversion unit is determined in advance such that an average pixel value of the contour portion changes stepwise.

Accordingly, the dot-conversion thins the dots in the contour portion so that the number of dots decreases as the position moves toward the outer side of the mask image. Accordingly, by selectively combining the first and second pattern images according to the pixel value (dots) of the mask image, it is possible to change slowly the rate of combination of the first and second pattern images in the contour portion, and it is possible to provide the latent image that is more hard to recognize.

For achieving the above features, a yet another aspect of the example embodiment provides an image processing method for producing an image containing a latent image by combining different kinds of pattern images with a computer having a memory and a processing unit, including a pattern producing step of producing a second pattern image having substantially the same shade level as a provided first pattern image based on the first pattern image; and a latent image producing step causing the processing unit to produce the image containing the latent image by selectively combining the first pattern image and the produced second pattern image according to values of respective pixels of a mask image read from the memory.

For achieving the above features, a further another aspect of the example embodiment provides an image processing method for producing an image containing a latent image by combining different kinds of pattern images with a computer having a memory and a processing unit, including an image smoothing step of causing the processing unit to effect smoothing processing on a mask image read from the memory; and a latent image producing step of causing the processing unit to produce the image containing the latent image by combining the first and second pattern images having substantially the same shade level at a mixing ratio according to an output of the smoothing processing in the image smoothing step.

For achieving the above features, a further aspect of the example embodiment provides an image processing method for producing an image containing a latent image by combining different kinds of pattern images with a computer having a memory and a processing unit, including a contour dot-conversion step of causing the processing unit to convert a contour portion of a mask image read from the memory to dots; and a latent image producing step of producing the image containing the latent image by selectively combining the first and second pattern images having substantially the same shade level according to a value of each pixel of the mask image having the contour portion subjected to the dot conversion by the contour dot-conversion unit.

A further aspect of the example embodiment provides an image processing program for causing a computer to execute the foregoing image processing method.

A further aspect of the example embodiment provides machine-readable record medium storing an image processing program for causing a computer to execute the foregoing image processing method.

A further aspect of the example embodiment provides a printed matter hearing, in a printed fashion, an image containing a latent image and produced by the foregoing image processing apparatus.

According to the example embodiment presented herein, the image containing the latent image is viewed as an image having a uniform shade level so that it is possible to provide the latent image that is hard to recognize by the naked eye. Consequently, even when the information is embedded in the first pattern image, the information can be concealed. Therefore, it becomes unnecessary to provide a camouflage pattern over an image containing the latent image for concealing the information, and such a situation can be avoided that the information containing the embedded first pattern is lost due to the camouflage pattern.

The foregoing and other, features, aspects and advantages of the present embodiment will become more apparent from the following detailed description of the present embodiment when taken in conjunction with the accompanying drawings.

BRIEF DESCRIPTION OF THE DRAWINGS

FIG. 13 is a flowchart illustrating a control procedure of a program executed by an image processing apparatus according to the second embodiment.

FIG. 14 illustrates an example of a smoothing filter.

DESCRIPTION OF THE PREFERRED EMBODIMENTS

Embodiments will now be described with reference to the drawings.

In the following description and drawings, corresponding portions bear the same reference numbers and the same names, and achieve the same functions. Therefore, description thereof is not repeated.

The processing in the image processing apparatus according to each of the embodiments is achieved by software (program or data) that is executed on a CPU (Central Processing Unit) such as a computer or a workstation. The processing may also be achieved by software executed on a CPU performing image processing and control, e.g., in a printer or a copying machine that is provided with a printer function and a scanner function. Further, it may be achieved by dedicated hardware.

(Structure of the Apparatus)

Figure 1:
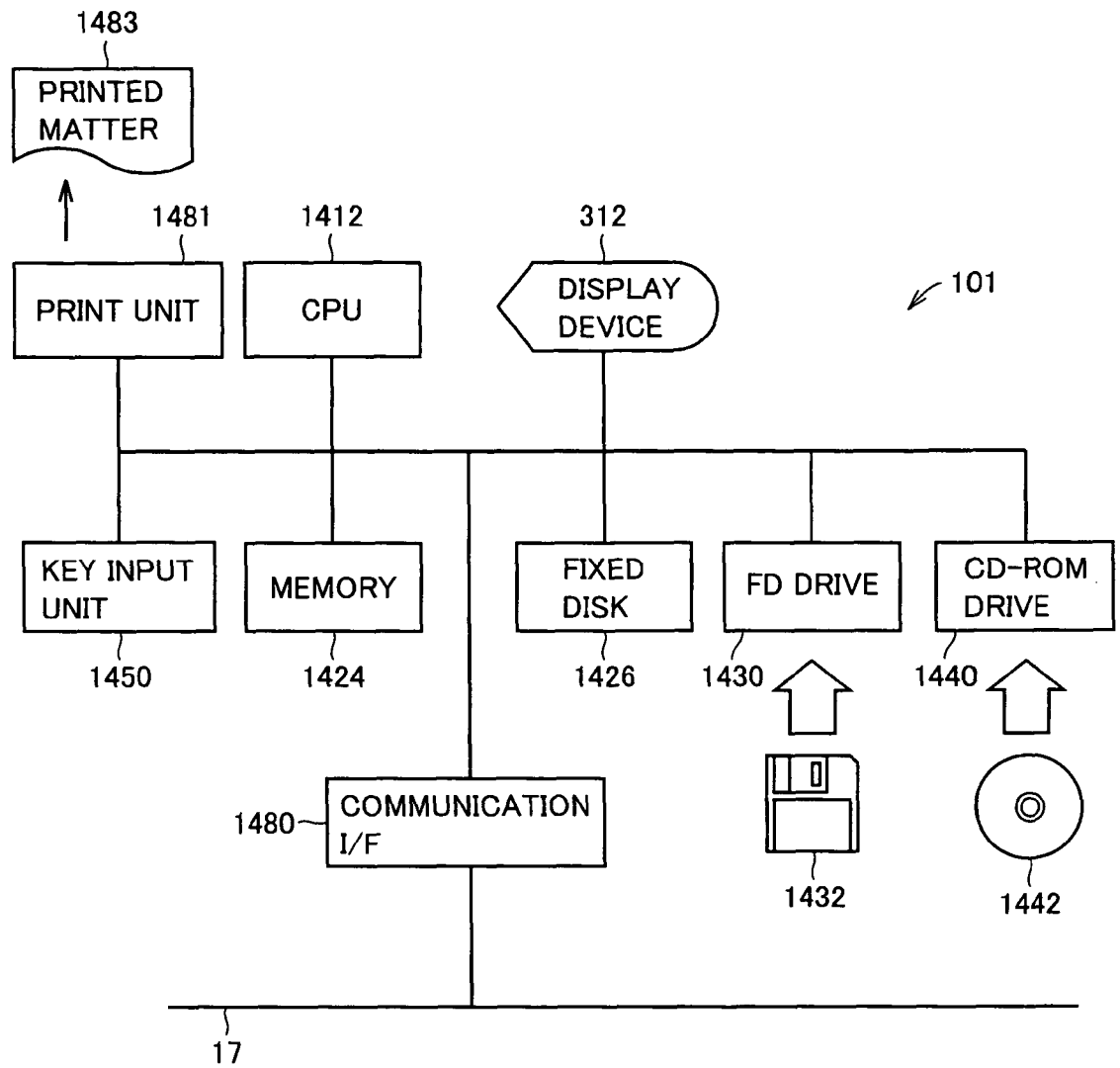
FIG. 1 is a block diagram of a computer according to various embodiments.

FIG. 1 is a block diagram of a computer 101 according to each of embodiments.

Referring to FIG. 1, computer 101 includes a display device 312 formed of a liquid crystal display or a CRT (Cathode-Ray Tube) for displaying information, a key input unit 1450 that is operated for externally entering information such as an instruction, a CPU 1412 for centrally controlling the computer, a memory 1424 including a ROM (Read Only Memory) or a RAM (Random Access Memory), a fixed disk 1426, an FD (Flexible Disk) drive 1430 into which an flexible disk 1432 is detachably attached for accessing flexible disk 1432, a CD-ROM drive 1440 into which a CD-ROM (Compact Disc Read Only Memory) 1442 is detachably attached for accessing mounted CD-ROM 1442, a communication interface (I/F) 1480 and a print unit 1481.

Communication interface 1480 has a function of connecting a communication path 17 and computer 101 together for communications. Communication path 17 may be selected from among various kinds of networks including the Internet. In computer 101, various data including image data 4, 7 and 9 containing latent images to be described later and the like undergo image processing for printing by CPU 1412, and are supplied to print unit 1481, which prints the data on sheets of paper to provide a printed matter 1483. These data may be transmitted via communication interface 1480 and communication path 17 to a printer (not shown), which prints them to provide printed matter 1483.

Computer 101 in FIG. 1 may be provided with a magnetic tape device into which a magnetic tape in a cassette form is detachably attached for accessing.

Software to be loaded into computer 101 shown in FIG. 1 is distributed by storing them on a record medium such as CD-ROM 1442 or flexible disk 1432, or is distributed by data communications via communication path 17. CPU 1412 stores the software that is read from CD-ROM 1442 or flexible disk 1432 loaded into flexible disk drive 1430 in a predetermined storage area of computer 101 or the workstation. Thereafter, the software is read from the predetermined storage area, and is executed.

Figure 2:
FIG. 2 shows by way of example a pattern appearing when basic patterns are arranged.

In each of the embodiments, a "pattern" is an image formed of a plurality of dots, a "density" represents the number of dots per unit area of the pattern, and a "shade level" is a level or degree of the shade (or an apparent darkness or thickness) exhibited by the dots of the pattern. The density and the shade level correlate with each other, but the shade level changes depending on the thickness or size of the dots forming the pattern even when the density is constant. The "pattern" represents a "pattern" exhibited by an arrangement of a plurality of basic patterns each bearing information of "0" or "1" assigned thereto. For example, it is assumed that there are basic patterns of "/" and "\". Although each pattern is formed of an inclined line, these patterns arranged in an appropriate fashion can form a diamond "pattern" as shown in FIG. 2. The "embedding" of the predetermined image (pattern) into a certain image represents combination of the predetermined image and the certain image.

The basic principle of latent image printing utilized in the invention is disclosed in Japanese Patent Laying-Open No. 54-074125. Thus, the latent image is embedded by combining two kinds of patterns having the same apparent darkness or thickness. Between the two kinds of patterns, one of them is the pattern that is left on a copy-resultant matter when copied by a copying machine, and thus is a pattern formed of course and large dots. The other pattern disappears when copied, and thus is a pattern formed of fine and small dots. The other pattern may not be a pseudo shaded pattern, and may be a halftone pattern exhibiting the same shade level as the above one pattern.

Further, the principle of the latent image may not be a pattern of dots, and may be a set or group of lines. It is important that the patterns have the same apparent darkness (and exhibit substantially the same image shade level), and include the pattern that "disappears" on the copy-resultant matter and the pattern than "remains", and the latent image is embedded in the image by combining these patterns.

First Embodiment

A first embodiment will now be described with reference to the drawings.

(Function Structure)

Figure 3:
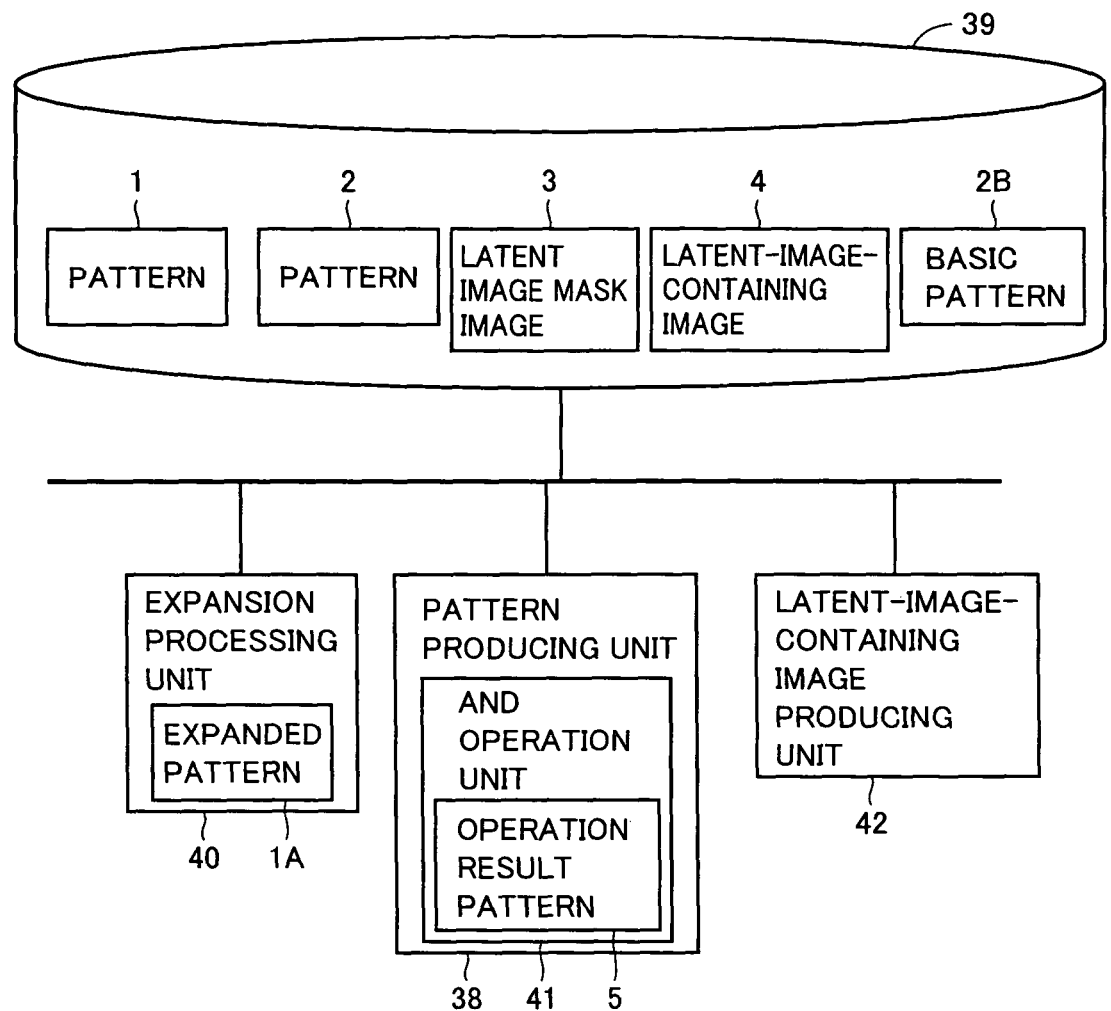
FIG. 3 is a function diagram illustrating a first embodiment.

FIG. 3 shows a function structure according to this embodiment. Referring to FIG. 3, the image processing apparatus according to the embodiment includes a data storing unit 39, an expansion processing unit 40, a pattern producing unit 38 having an AND operation unit 41 and an image producing unit 42 producing a latent-image-containing image, i.e., an image containing a latent image. Data storing unit 39 stores in advance a pattern 1 that is an image data of a dot pattern, a basic pattern 2B that is an image data of a dot pattern and a mask image data 3 for the latent image, and further stores a pattern 2 that is image data of a dot pattern produced by pattern producing unit 38, and data 4 of the latent-image-containing image produced by image producing unit 42. Data storing unit 39 corresponds to a predetermined area in memory 1424 or fixed disk 1426. Pattern producing unit 38 having AND operation unit 41, expansion processing unit 40 and latent-image-containing image producing unit 42 correspond to functions of programs stored in advance in memory 1424 or fixed disk 1426. CPU 1412 reads and executes the programs to achieve the respective functions. Alternatively, dedicated circuits may be employed.

(Processing Procedure)

Figure 4:
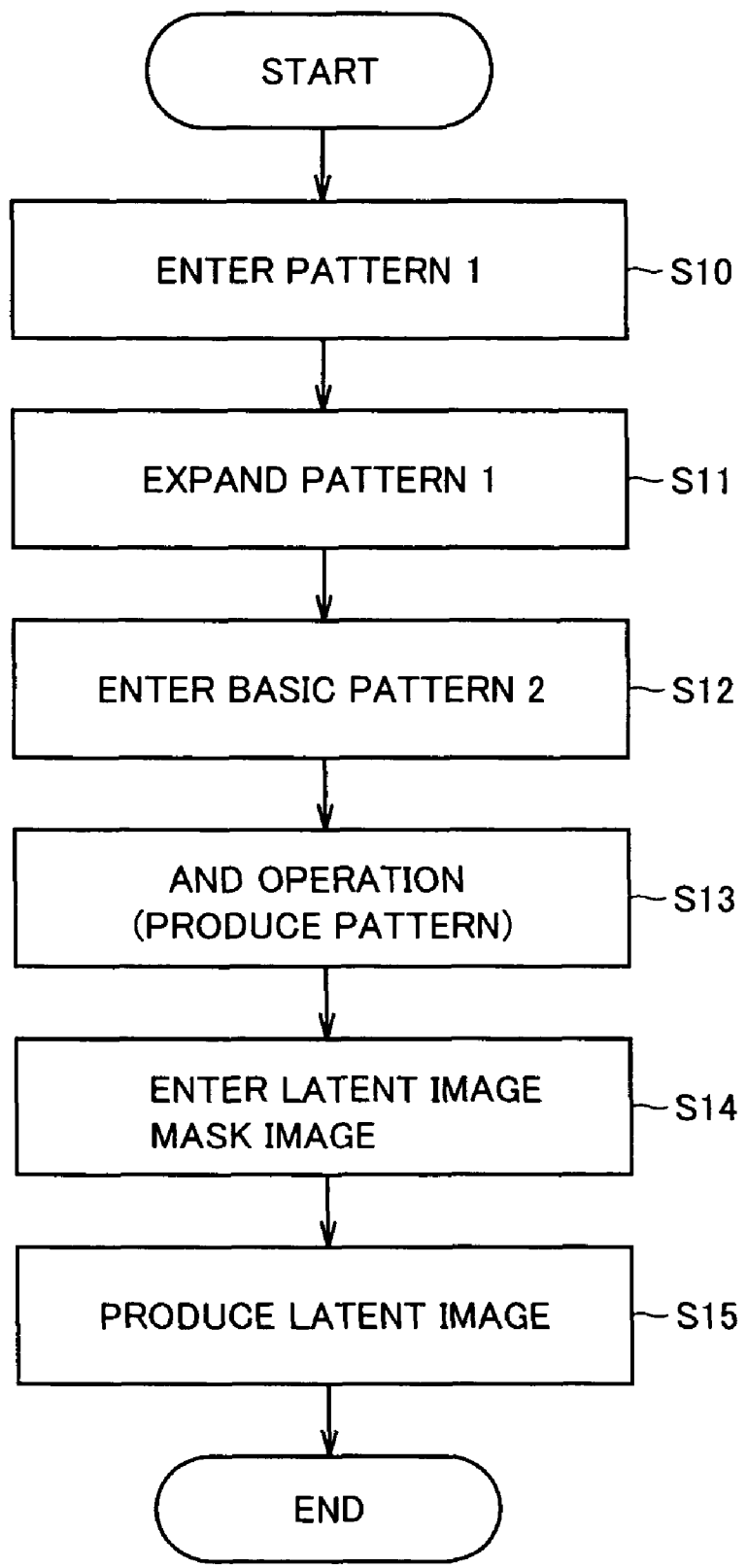
FIG. 4 is a flowchart illustrating a control procedure of a program executed by an image processing apparatus according to the first embodiment.

Referring to FIG. 4, description will now be given on an image processing procedure according to the embodiment.

First, expansion processing unit 40 reads pattern 1 from data storing unit 39 in step S10. In pattern 1, information is embedded by arranging a plurality of basic patterns to which specific symbols are assigned, e.g., according to the prior art disclosed in Japanese Patent Laying-Open No. 2003-101762. In step S11, expansion processing unit 40 effects the known expansion processing on pattern 1 thus read to produce and output an expanded pattern 1A. In steps S12 and S13, pattern producing unit 38 reads basic pattern 2 from data storing unit 39, receives expanded pattern 1A from expansion processing unit 40 and provides an instruction for the arithmetic to AND operation unit 41. AND operation unit 41 performs the logical AND between the read basic pattern 2 and expanded pattern 1A provided thereto. An operation result pattern 5 indicating a result of the logical AND is stored as pattern 2 in data storing unit 39. In subsequent steps S14 and S15, latent-image-containing image producing unit 42 reads latent image mask image data 3 (i.e., mask image data 3 for producing the latent image) and patterns 1 and 2 from data storing unit 39, produces latent-image-containing image data 4 using the data thus read and stores latent-image-containing image data 4 thus produced in data storing unit 39.

Figure 28A:
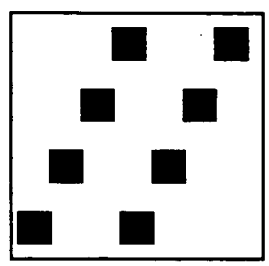
FIGS. 28A and 28B illustrate dot patterns bearing symbols.
Figure 28B:
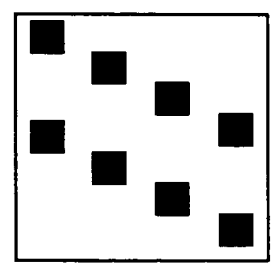
Figure 29:
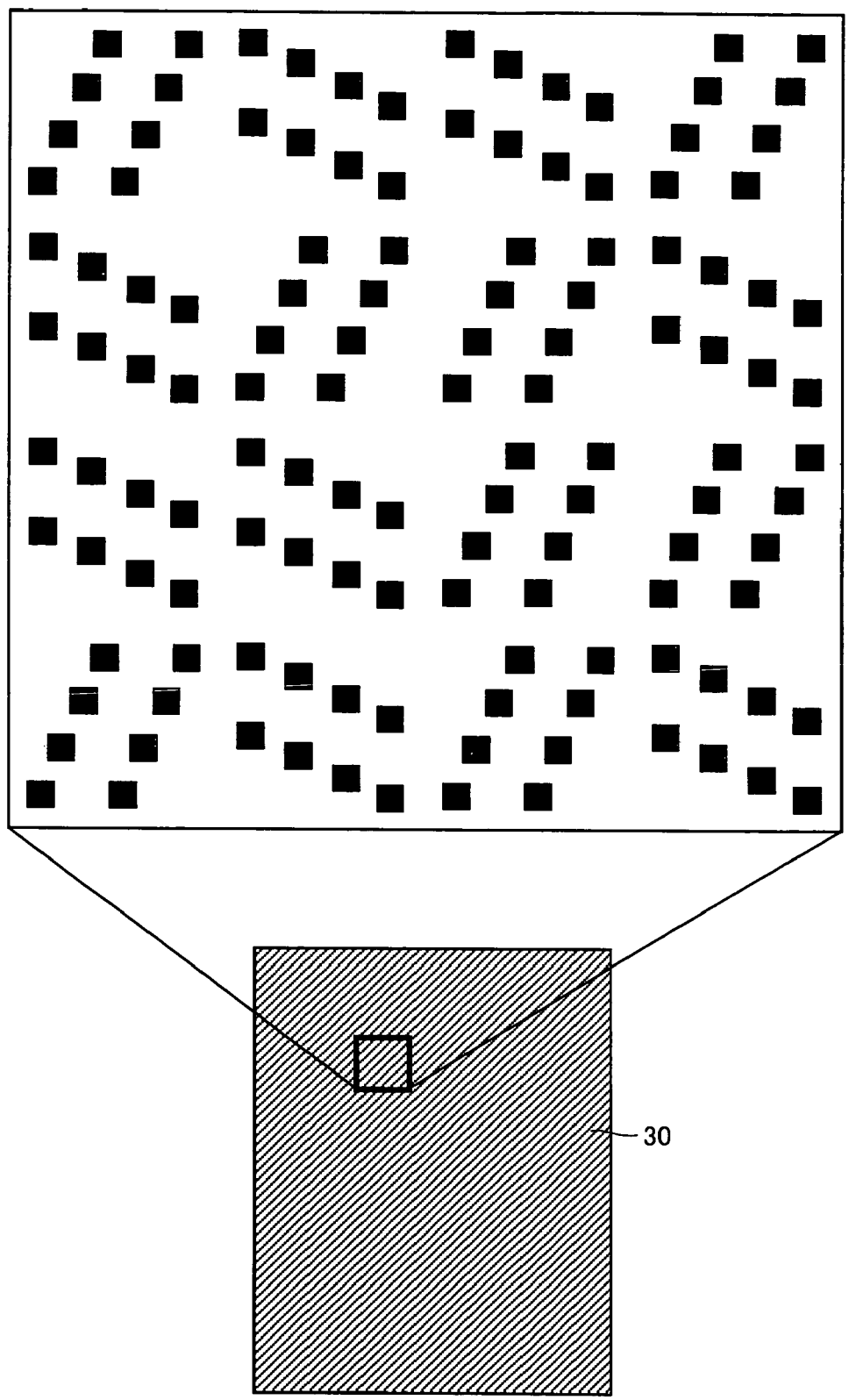
FIG. 29 illustrates a background image formed by arranging dot patterns bearing symbols.

Description will now be given on pattern 1 with reference to FIGS. 28A, 28B and 29. It is assumed that patterns in FIGS. 28A and 28B are basic patterns, to which symbols of 0 and 1 are assigned, respectively. By arranging these basic patterns, it is possible to produce such a pattern that information formed of arrangement of the symbols of 0 and 1 is embedded in the whole image as shown in FIG. 29. The pattern in FIG. 29 thus produced is used as pattern 1 in this embodiment. Error correction codes are used for embedding the information, or the information is embedded in a repeating fashion. Thereby, the information can be correctly even when the latent image is embedded in a part of pattern 1.

Pattern 1 is produced further in the following procedure. For producing pattern 1, an empty image area having the same size as text and image to be combined later is ensured on a memory that is prepared in advance. An "empty" image is not necessarily white, but represents an image having undefined pixel values. The basic patterns each bearing information of the symbol of 0 or 1 assigned thereto are arranged in a tiled fashion over this empty image. This arrangement corresponds to processing of spreading the basic patterns by "replacement" or "overwriting" over each of "areas divided into a mesh like fashion and each having the same size as the basic pattern".

Figure 5A:
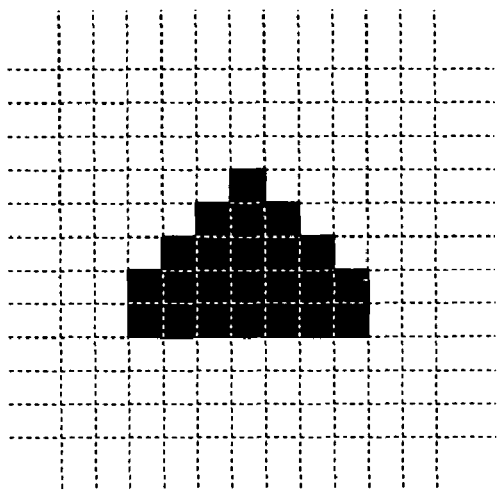
FIGS. 5A and 5B illustrate expansion processing.
Figure 5B:
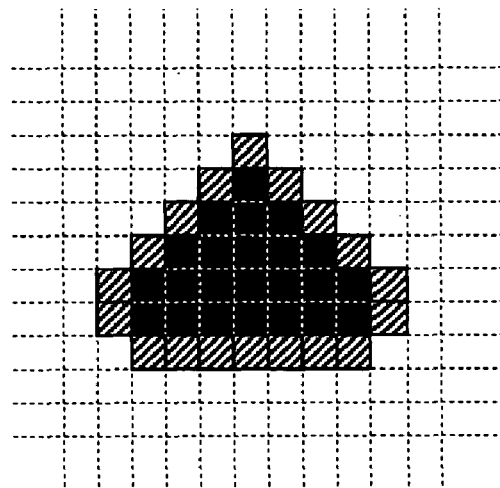

Referring to FIGS. 5A and 5B, description will now be given on the processing in step S11. In FIG. 5A, each square represents one pixel of the image. When the expansion processing that is a known art is effected on the image in FIG. 5A, white pixels neighboring to the image are converted to black pixels as indicated by hatching in FIG. 5B, and thus black pixels are added to the periphery of the image. The example of expansion processing in FIGS. 5A and 5B employs a four-vicinity distance that uses pixels on the laterally and vertically opposite sides of the pixel in question as the neighboring pixels. However, the processing may employ an eight-vicinity distance additionally using pixels in obliquely neighboring positions.

In step S11, the expansion processing is repeated several times depending on the pattern form and the dot density of pattern 1. The number of times of repetition is determined depending on the form and/or the density of the basic pattern used for producing pattern 1. If the image is excessively expanded, the form of the basic pattern is impaired so that the expansion processing is repeated to an extent that can maintain the form.

Figure 6:
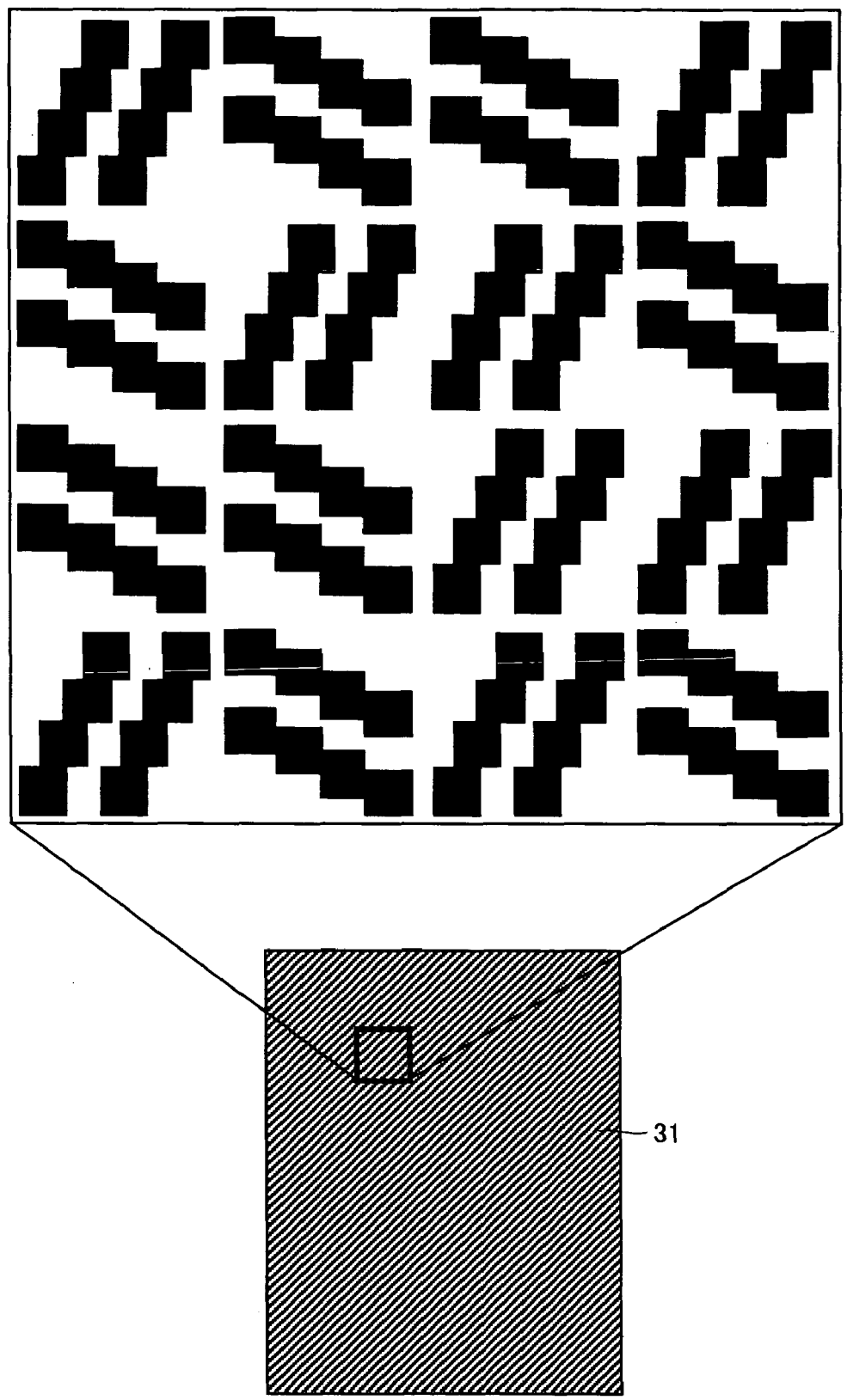
FIG. 6 illustrates a result of expansion processing effected on an image.

FIG. 6 shows a pattern 31 corresponding to the result obtained by repeating the expansion processing on pattern 30 shown in FIG. 29 in step S11. As a result of repeating the expansion processing several times that are appropriately set as described above, pattern 31 in FIG. 6 can keep the rough pattern that is exhibited by arranging the basic patterns according to the information, although fine spaces in pattern 30 are closed. By the expansion processing, the pattern corresponding to the embedded information can be kept as described above, although the fines spaces are removed. In other words, the expansion processing removes the local features in pattern 30, and leaves only major features in pattern 31.

(Production of Pattern 2)

Figure 7:
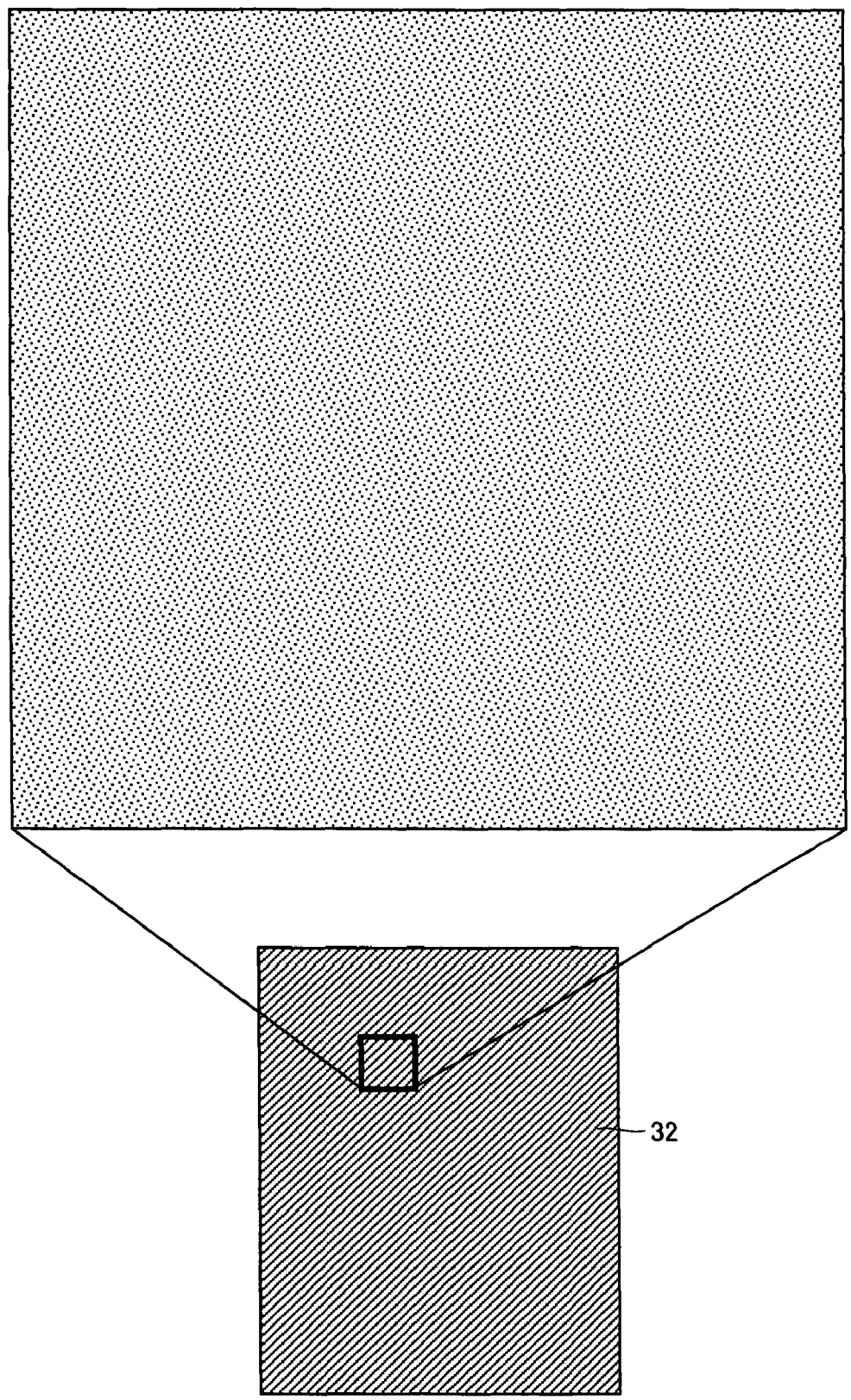
FIG. 7 illustrates a pattern that is used for forming a latent image and is not a dot pattern bearing a symbol.

Referring to FIG. 7, description will now be given on pattern 2. Pattern 2 and basic pattern 2B do not bear information formed of symbol of 1 or 0 in contrast to pattern 1. Pattern 2 and basic pattern 2B are produced by pattern producing unit 38 such that these patterns have substantially the same shade level (i.e., exhibit substantially the same shade level) as pattern 1 as a result of the processing procedure in FIG. 4, and are stored in data storing unit 39. Data storing unit 39 stores basic pattern 2B according to a copying capability of a copying machine for copying a target. More specifically, when pattern 1 is a fine and dense pattern (having small dots with narrows spaces therebetween) that will substantially disappear when copied by the above copying machine, data storing unit 39 stores basic pattern 2B providing pattern 2 which will form a coarse pattern (having large dots with wide spaces therebetween) on a copy-resultant matter of the copying machine. When pattern 1 is a coarse pattern that will be substantially left on the copy-resultant matter, data storing unit 39 stores such basic pattern 2B providing pattern 2 which is fine and dense, and will not be left on the copy-resultant matter. Pattern 2 may have the same size as pattern 1, or may be produced by repetitively referring to basic pattern 2B. A pattern 32 that is shown in FIG. 7 as pattern 2 exhibits the same shade level as pattern 31 that is shown in FIG. 29 as pattern 1, but is finer and denser than pattern 31.

In this embodiment, as described above, when the latent image is produced, the shade level of basic pattern 2B (that is a basic pattern for producing pattern 2, and is stored in advance in memory 1412) is set such that no difference occurs in shade level between the patterns 2 and 1 in the latent image. The processing in step S13 affects the shade level of pattern 2.

The shade level of basic pattern 2B is preset such that the pattern 1 may have the same shade level (i.e., exhibits substantially same shade level) as pattern 2 produced by the processing in step S13. For the sake of simplicity, it is assumed that basic pattern 2B has the same size as pattern 1. More specifically, the processing in step S13 is effected on the image of basic pattern 2B read from memory 1424, and more specifically is performed to erase the pixels of the image according to pattern 1A prepared by expanding pattern 1. Therefore, basic pattern 2B is stored in advance in memory 1424 as a pattern darker or deeper than pattern 1.

Figure 8:
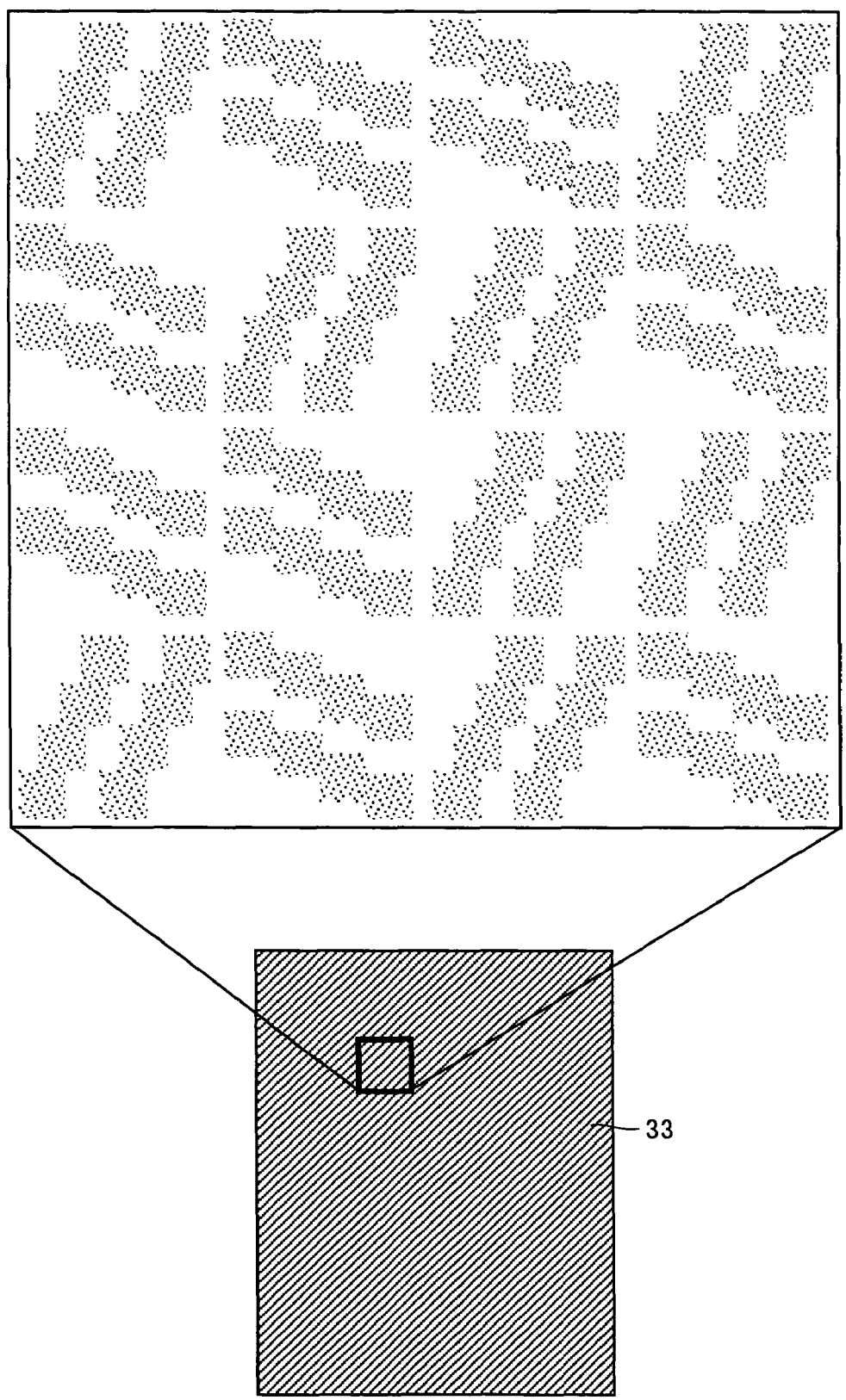
FIG. 8 illustrates an image resulting from a logical product operation of patterns.

Referring to FIGS. 6, 7 and 8, description will now be given on the production (step S13) of pattern 2 using AND operation unit 41 of pattern producing unit 38. It is assumed that the image of pattern 31 in FIG. 6 corresponding to expanded pattern 1A has the same size as the image of pattern 32 in FIG. 7 corresponding to basic pattern 2B. In the images of FIGS. 6 and 7, it is assumed that the black pixel indicates 1, and the white pixel indicates 0. When processing is performed to replace the value of each pixel of the image of pattern 32 in FIG. 7 with a resultant value of the logical AND operation performed between this value of each pixel of the image of pattern 32 and the value of corresponding pixel in the image of pattern 31 of FIG. 6, pattern 32 in FIG. 7 is converted to a pattern 33 in FIG. 8 indicating the AND operation resultant pattern 5. Pattern 33 in FIG. 8 corresponds to an image prepared by leaving only the black pixels that are included in pattern 32 shown in FIG. 7 and correspond to the black pixels in pattern 31 shown in FIG. 6, respectively. This logical AND operation can convert basic pattern 2B to pattern 33 (pattern 2) in FIG. 8, and can change pattern 2 to the pattern that is nearly the same as pattern 1 (or expanded pattern 1A) although not completely the same as pattern 1.

Figure 9:
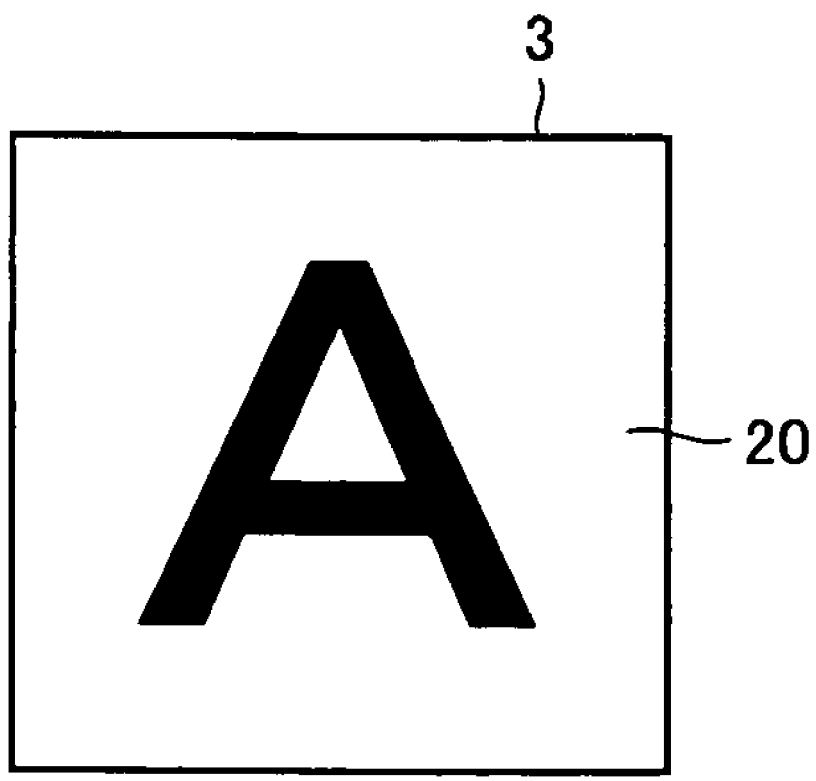
FIG. 9 illustrates a mask image to be embedded as a latent image.

Referring to FIG. 9, description will now be given on processing in steps S14 and S15. FIG. 9 shows, by way of example, latent image mask image data 3 representing the image embedded as the latent image. Latent-image-containing image producing unit 42 can selectively combine patterns 2 and 1 read from data storing unit 39 according to the value of each pixel of latent image mask image data 3, and thereby can produce image data 4 containing the latent image (image of letter "A") of the same form as the mask image. Depending on the size of latent-image-containing background image to be produced, latent image mask image data 3 and patterns 1 and 2 me be repetitively referred to when these are small. When these are large, each of them may be partially referred to.

The procedure of producing latent-image-containing image data 4 is further described. For producing latent-image-containing image data 4, an empty image area for the background image of the same size as text and image to be combined later is ensured in advance on memory 1424. It is assumed that the empty image area has a plurality of partial area divided into a mesh-like portions each having the same size as pattern 1 or 2. According to the value of each pixel of the mask image of latent image mask image data 3, latent-image-containing image producing unit 42 writes one of patterns 1 and 2 over the image data of the partial area corresponding to the pixel in question of the empty area. Alternatively, the image data in the partial area in question is replaced with one of patterns 1 and 2. More specifically, the image data in the partial area corresponding to the black pixel of the mask image is changed to pattern 2 by overwriting (or replacement), and the image data of the partial area corresponding to the white pixel is changed to pattern 1 by overwriting (or replacement). Patterns 1 and 2 are selectively combined according to the value of each pixel of the provided mask image so that image data 4 containing the latent image of the same form as the mask image can be produced as a result of the combining.

Figure 25A:
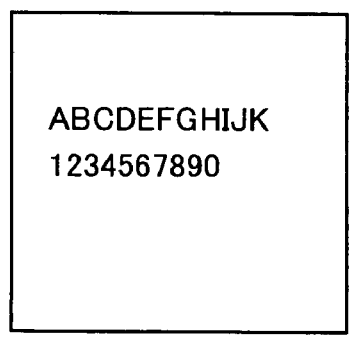
FIGS. 25A-25D illustrate an effect achieved when the background image containing the latent image and an original image overlaid thereon are copied.
Figure 25B:
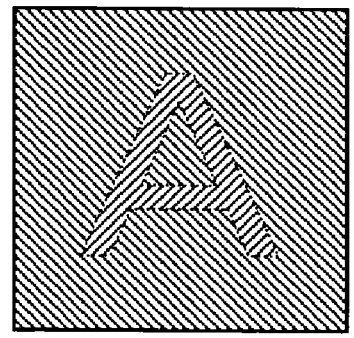
Figure 25C:
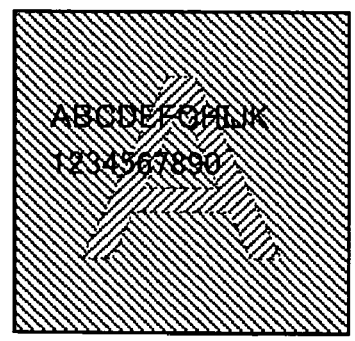
Figure 25D:
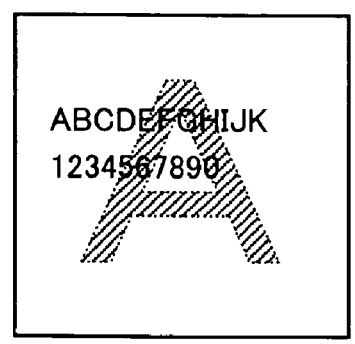
Figure 26:
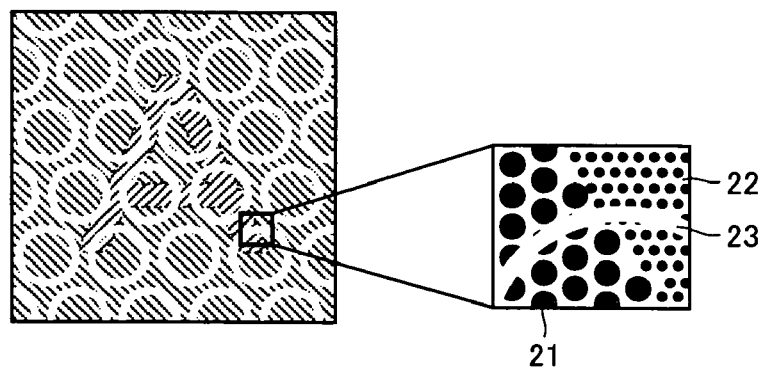
FIG. 26 illustrates a camouflage pattern.
Figure 27:
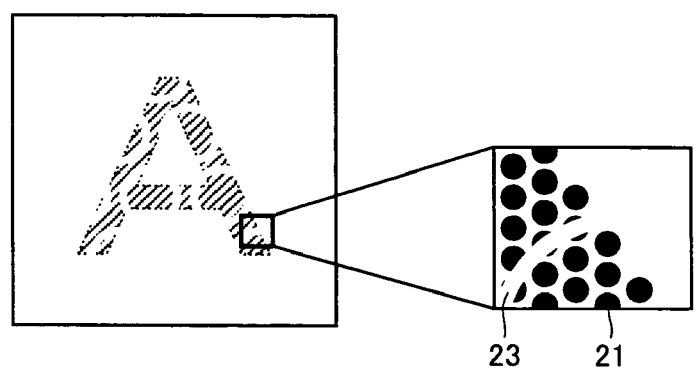
FIG. 27 illustrates a latent image that appears when copying the background image containing the latent image and camouflaged with the camouflage pattern.

The background image and the text image are independent of each other. Data 4 of the latent-image-containing background image produced in steps S14 and S15 corresponds to that in FIG. 25B. The text image corresponds to that in FIG. 25A. It is assumed that the background portion of the text image is "transparent". The text image is laid over the background image to combine these images so that the text image having the background image that contains the latent image is produced.

Although patterns 1 and 2 are monochrome binary image, these are not restricted to the binary images. For example, patterns 1 and 2 may be gray scale images or color images, e.g., of magenta. Since patterns 1 and 2 are not restricted to the binary images, the background image is likewise not restricted to the binary image. Although latent image mask image data 3 (i.e., the mask image data for the latent image) is basically binary image data, it is handled as multivalued image data (each pixel takes a decimal fraction value between 0 and 1) when smoothing processing is performed as described later.

Figure 10:
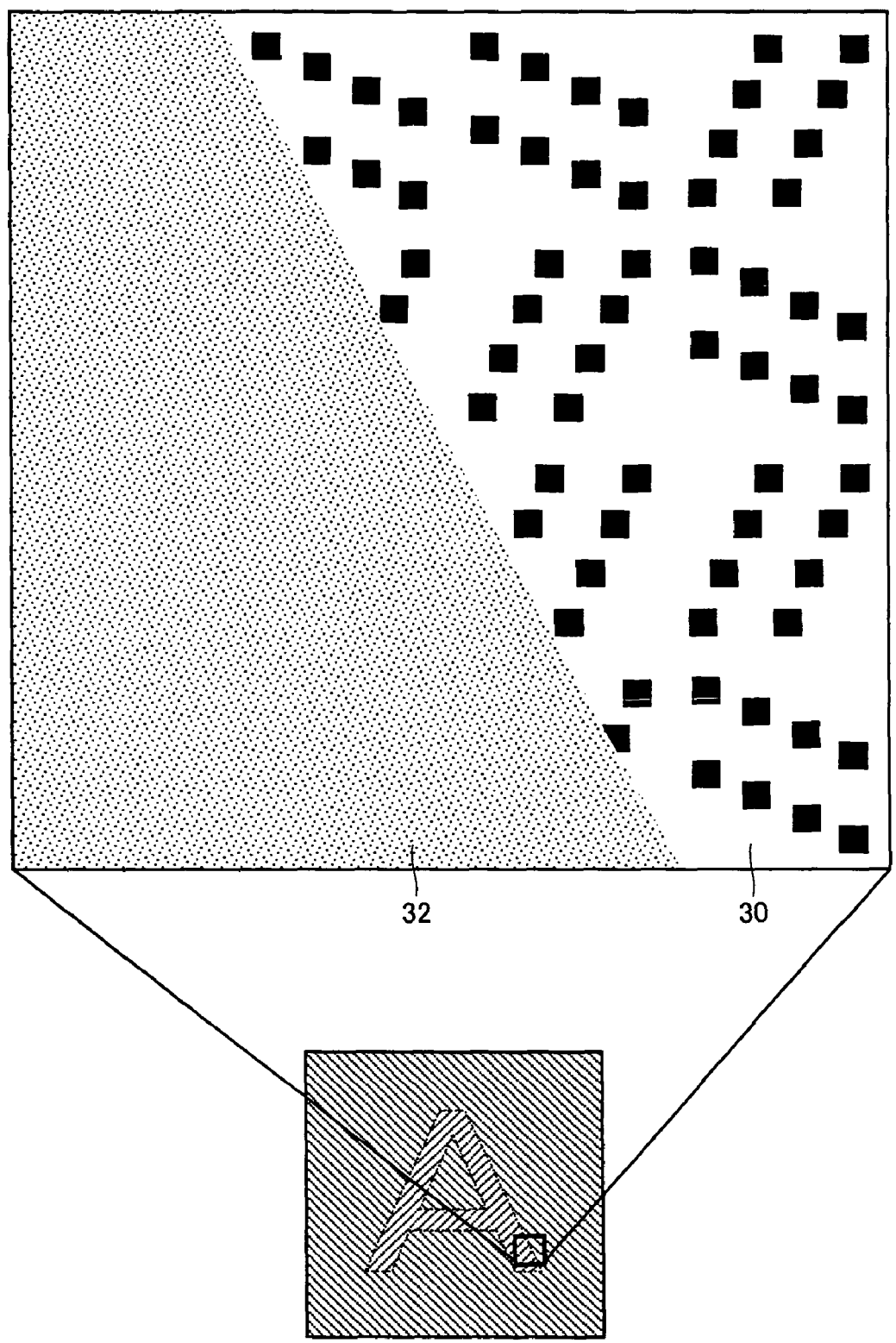
FIG. 10 illustrates a latent image forming by combining patterns.
Figure 11:
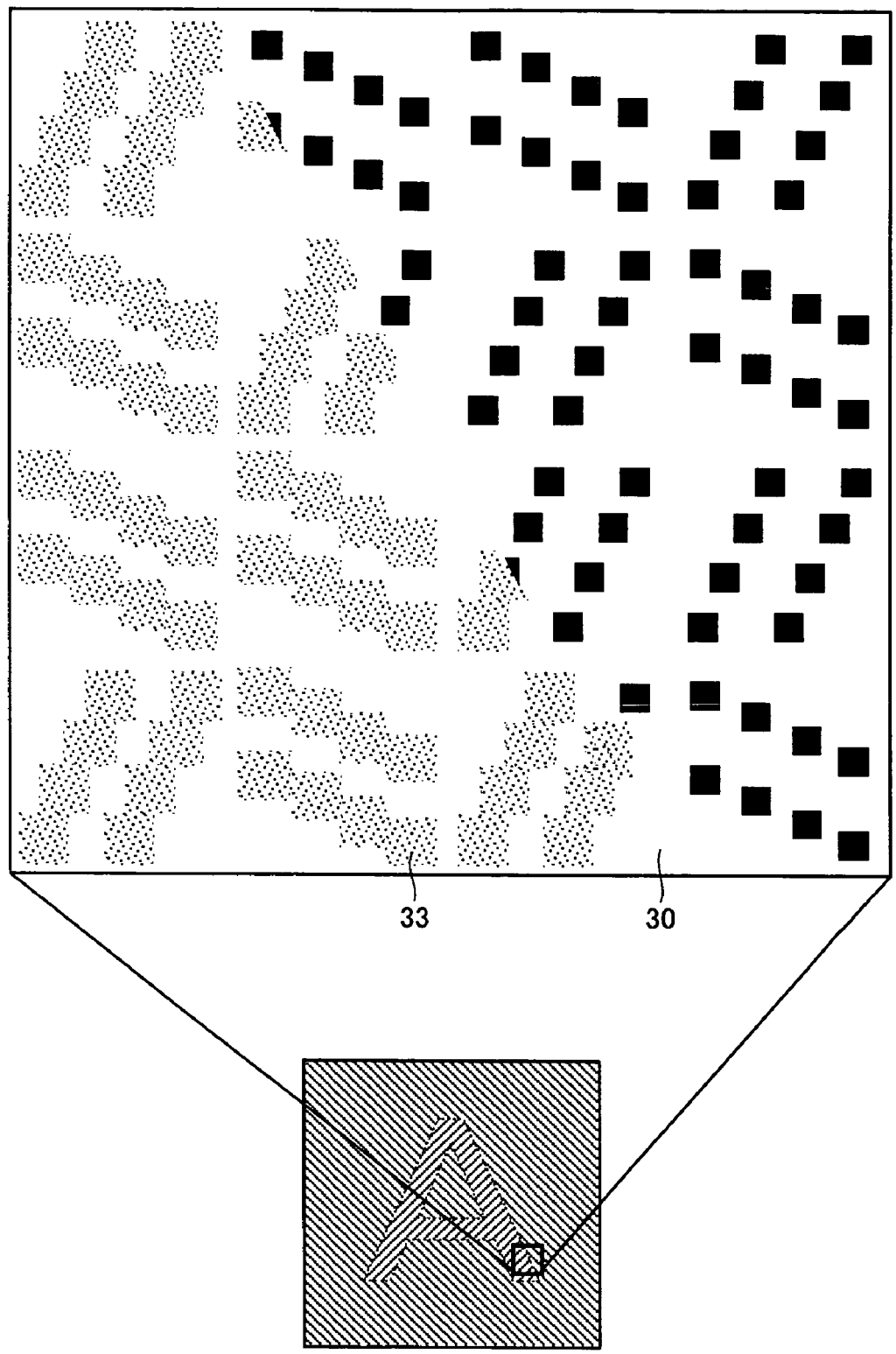
FIG. 11 illustrates a latent image formed by combining patterns.

Description will now be given on a difference in effect between the embodiment and the prior art in connection with latent-image-containing images in FIGS. 10 and 11. In a conventional latent-image-containing image shown in FIG. 10, a difference in density is present between pattern 32 for forming the latent image and pattern 30 around the latent image, and this causes a problem that a boundary portion between the neighboring patterns 32 and 30 can be recognized by the naked eye. In the latent-image-containing image according to the embodiment in FIG. 11, pattern 33 of the latent image is broadly similar to pattern 30 around the latent image (i.e., the user can view them as substantially the same patterns), which achieves an effect that a boundary portion between these patterns is inconspicuous to the naked eye.

Second Embodiment

A second embodiment will now be described with reference to the drawings.

(Function Structure)

Figure 12:
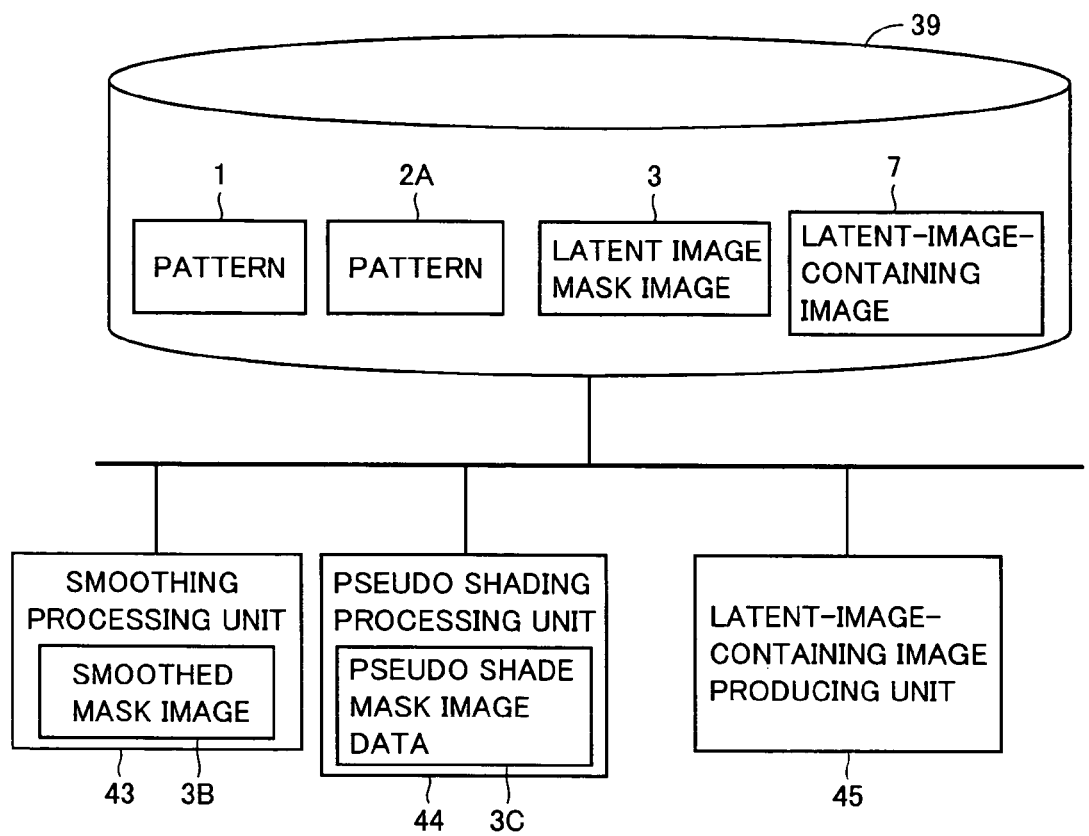
FIG. 12 is a function diagram according to a second embodiment.

FIG. 12 shows a function structure according to this embodiment. Referring to FIG. 12, an image processing apparatus according to this embodiment includes data storing unit 39, a smoothing processing unit 43, a pseudo shading processing unit 44 and a latent-image-containing image producing unit 45. Data storing unit 39 stores, in advance, patterns 1 and 2A, latent image mask image data 3 and latent-image-containing image data 7 produced by latent-image-containing image producing unit 45. Data storing unit 39 corresponds to a predetermined area in memory 1424 or fixed disk 1426. Smoothing processing unit 43, pseudo shading processing unit 44 and latent-image-containing image producing unit 45 correspond to functions of programs prestored in memory 1424 or fixed disk 1426, and CPU 1412 reads and executes the programs to achieve the functions of the respective units. These units may be formed of dedicated circuits.

(Processing Procedure)

Figure 15:
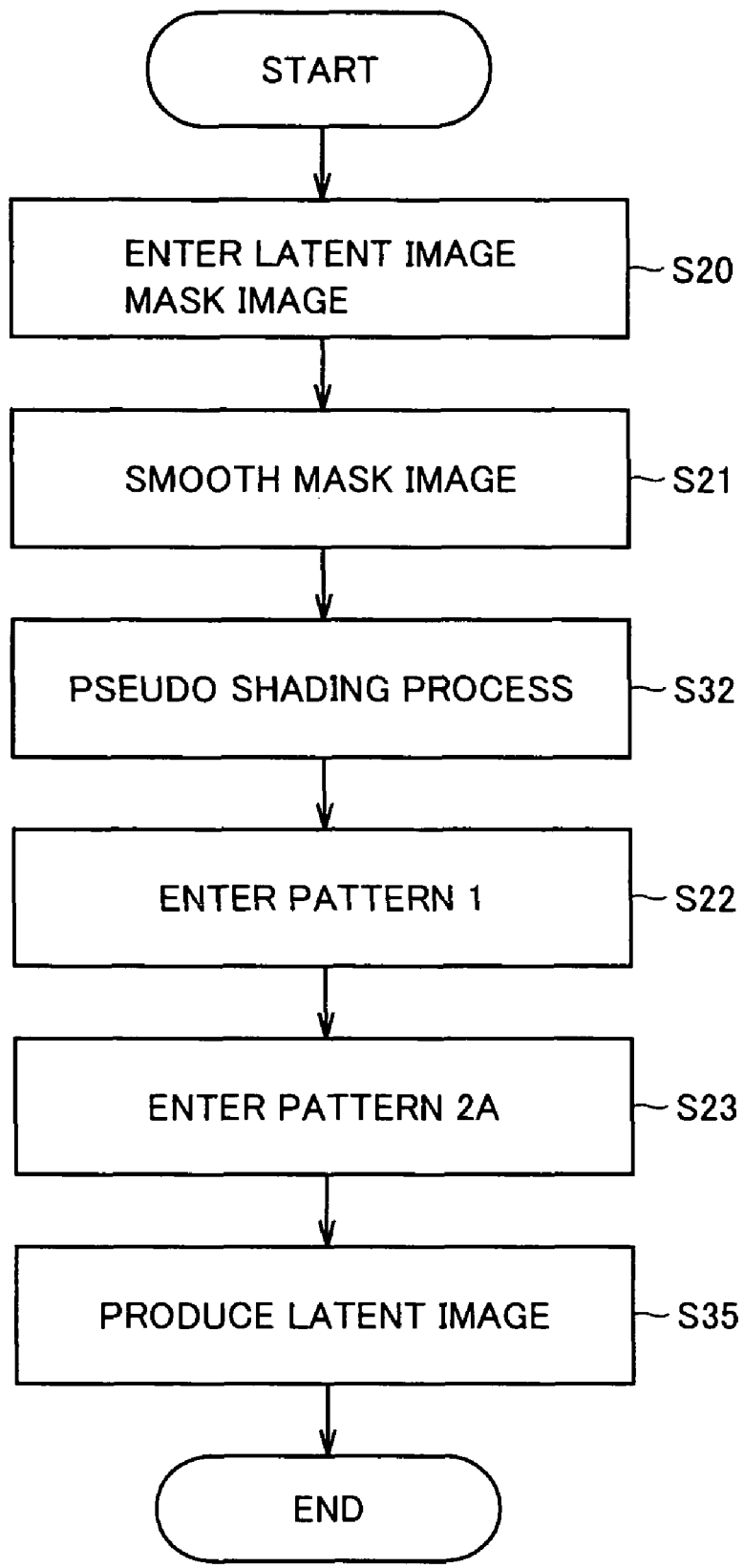
FIG. 15 is a flowchart illustrating another control procedure of the program executed by the image processing apparatus according to the second embodiment.

Referring to flowcharts of FIGS. 13 and 15, description will now be given on the programs executed by the image processing apparatus according to the embodiment. The flowchart of FIG. 15 differs from that of FIG. 13 in that processing in step S32 is additionally employed, and processing in step S24 is replaced with processing in step S35. Other processing in the flowchart of FIG. 15 is the same as that in FIG. 13.

Referring to FIG. 13, smoothing processing unit 43 reads latent image mask image data 3 stored in data storing unit 39 in step S20, and performs smoothing processing on latent image mask image data 3 thus read in step S21. Latent-image-containing image producing unit 45 reads patterns 1 and 2A from data storing unit 39 in steps S22 and S23, produces latent-image-containing image data 7 in step S24 and stores latent-image-containing image data 7 thus produced in data storing unit 39.

It is assumed that latent image mask image data 3 is the same as latent image mask image data 3 of the first embodiment, and pattern 1 is the same as that in the first embodiment. However, in contrast to the fact that pattern 2 in the first embodiment is produced based on the image prepared by expanding pattern 1, pattern 2A in the second embodiment is an arbitrary image having substantially the same shade level as pattern 1. Pattern 2 produced in the first embodiment may be utilized as pattern 2A in the second embodiment.

Referring to FIG. 14 showing an example of a smoothing filter, description will now be given on the smoothing processing in step S21. Data of the smoothing filter in FIG. 14 is prestored in memory 1424 or the like, and is read by smoothing processing unit 43, which performs the smoothing processing using the smoothing filter data thus read. The smoothing processing in itself is a known technique. A contour of the mask image can be blurred by effecting the smoothing processing on latent image mask image data 3 in this embodiment.

The following equation (1) expresses the smoothing processing using the smoothing filter in FIG. 14, and the following equation (2) expresses processing of producing the latent-image-containing image in step S24

$$r_{i,j} = \sum_{l=-1}^{1} \sum_{k=-1}^{1} \frac{1}{10} m_{i+k,j+1} + m_{i,j} \quad (1)$$

$$I_{i,j} = P1_{i,j} \times r_{i,j} + P2_{i,j} \times (1 - r_{i,j}) \quad (2)$$

When the image has a rectangular form, variables i and j in the equations (1) and (2) represent coordinate values on the abscissa and ordinate of the image, respectively, and a variable m represents a mask image indicated by latent image mask image data 3. A variable $m_{i,j}$ represents a pixel value of the coordinate (i, j) of a mask image m. Likewise, a variable $r_{i,j}$ represents a pixel value of the coordinate (i, j) of an image r represented by mask image data 3B subjected to the smoothing processing. Variables $P1_{i,j}$ and $P2_{i,j}$ represent pixel values of coordinates (i, j) of images P1 and P2 of patterns 1 and 2A, respectively. A variable $I_{i,j}$ represents a pixel value of the coordinate (i, j) of a background image I in which the latent image is to be embedded. As can be seen from the equation (2), it is assumed that the background image represented by variable $I_{i,j}$ and the images of patterns 1 and 2A represented by respective variables $P1_{i,j}$ and $P2_{i,j}$ have the same size.

When mask image m has pixel value $m_{i,j}$ in a value range between 0 and 1, it is not necessary to normalize it. When the maximum value of the value range is larger than 1, the right side in the equation (1) is divided by the maximum value of the value range of pixel value $m_{i,j}$ of the mask image. Thereby, pixel value $m_{i,j}$ of coordinate (i, j) of mask image m can be normalized to a value between 0 and 1. Consequently, it is possible to obtain the pixel value of coordinate (i, j) of mask image r subjected to the smoothing processing (and corresponding to smoothed mask image 3B), i.e., the pixel value represented by variable $r_{i,j}$.

The processing of producing the latent-image-containing image is represented by the equation (2). Thus, in this processing, each pixel value $I_{i,j}$ of a background image I is replaced with the value obtained by mixing (adding) pixel value $P1_{i,j}$ corresponding to pattern 1 and pixel value $P2_{i,j}$ corresponding to pattern 2 based on the rate or ratio according to pixel value $r_{i,j}$ corresponding to mask image r that is represented by latent image mask image data 3 subjected to the smoothing processing. The data of background image I represented by a result of the mixing processing indicates latent-image-containing image data 7.

(Addition of Pseudo Shading Processing)

As illustrated in FIG. 15, pseudo shading processing (step S32) by pseudo shading processing unit 44 is added, whereby the calculation of the equation (2) can be eliminated.

In FIG. 15, processing in steps S20 and S21 is performed similarly to the foregoing embodiment. In subsequent step S32, pseudo shading processing unit 44 performs the pseudo shading processing on smoothed mask image data 3B provided from smoothing processing unit 43. Thereafter, latent-image-containing image producing unit 45 reads patterns 1 and 2A from data storing unit 39 in steps S22 and S23, and image data 7 containing the latent image is produced in step S35, and is stored in data storing unit 39.

By performing the pseudo shading processing (step S32) by pseudo shading processing unit 44, it is possible to eliminate the calculation of the equation (2) that requires a relatively long calculation time. Thus, pseudo shading processing unit 44 receives latent image mask image data 3B subjected to the smoothing processing from smoothing processing unit 43, performs the pseudo shading processing on received latent image mask image data 3B, and thereby converts it to latent image mask image data 3C subjected to pseudo shading processing. Thereby, the operation of the equation (2) is not required, and latent-image-containing image producing unit 45 can produce latent-image-containing image data 7 achieving a similar effect merely by selectively combining pattern 1A or 2A with reference to latent image mask image data 3C subjected to the pseudo shading processing.

The pseudo shading processing in step S32 is performed by a known technique such as dither processing or error diffusion processing. By this processing, smoothed mask image data 3B having a continuous tone owing to the smoothing processing is converted to latent image mask image data 3C that is binary image data.

This pseudo shading processing will now be described in connection with the case where the dither method is used as the processing of converting the continuous tone to the pseudo tone.

Figures 16, 17:
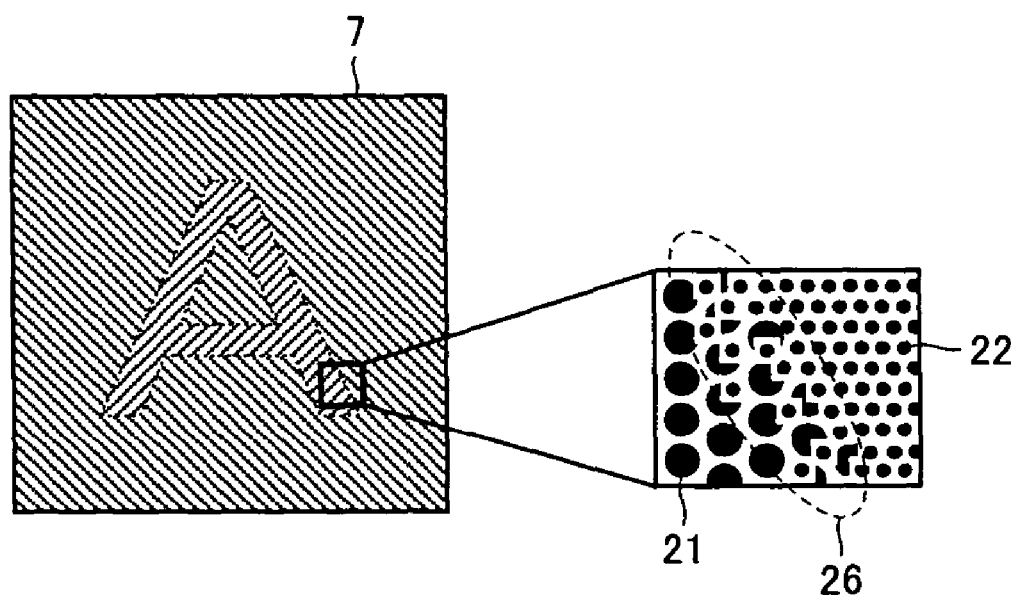
FIG. 16 illustrates an example of a dither matrix.
FIG. 17 illustrates a boundary portion of a latent image using a mask image subjected to pseudo gradation processing.

Assuming that variable $r_{i,j}$ is in a range between 0 and 1, memory 1424 prestores data of a dither matrix D, e.g., shown in FIG. 16. Specific values in each of the columns and rows of dither matrix D are not restricted to those in FIG. 16. Pseudo shading processing unit 44 reads data of dither matrix D from memory 1424. Using the read data of dither matrix D and the following equation (3), the magnitude of each pixel value represented by variable $r_{i,j}$ of smoothed mask image data 3B provided from smoothing processing unit 43 is compare with that of the value of corresponding pixel in dither matrix D. Based on the result of this comparison, the value of each pixel $r_{i,j}$ is converted to pixel value $r'_{i,j}$. Pixel value $r'_{i,j}$ represents 0 or 1. Therefore, smoothed mask image data 3B is converted to the pseudo shade mask image data 3C indicating binary image data.

$$r'_{i,j} = \begin{cases} 0 & (r_{i,j} < D_{i \bmod 4, j \bmod 4}) \\ 1 & (r_{i,j} \geq D_{i \bmod 4, j \bmod 4}) \end{cases} \quad (3)$$

The processing in step S35 is similar to that in step S15, and therefore description thereof is not repeated. Latent-image-containing image producing unit 45 combines patterns 1 and 2A with each other with reference to pseudo shade mask image data 3C. This produces latent-image-containing image data 7, which is shown in FIG. 17. In the image shown in FIG. 17, a boundary 26 between patterns 21 and 22 corresponding to respective patterns 1 and 2 is unclear and inconspicuous.

As described above, since latent-image-containing image data 7 is produced by mixing patterns 1A and 2A according to the respective pixel values of the smoothed mask image data 3B, the patterns 1 and 2A are gently or smoothly combined. Therefore, the boundary portion is inconspicuous although a camouflage pattern is not overlaid.

A similar effect can be achieved in a simplified manner by using smoothed mask image data 3B for producing of latent-image-containing image data 7 after effecting the pseudo shading processing thereon.

Therefore, even when information is embedded, e.g., in at least one of patterns 1 and 2A, the whole pattern is not destroyed by a camouflage pattern so that the latent image can be kept inconspicuous without losing the information.

Third Embodiment

Figure 18:
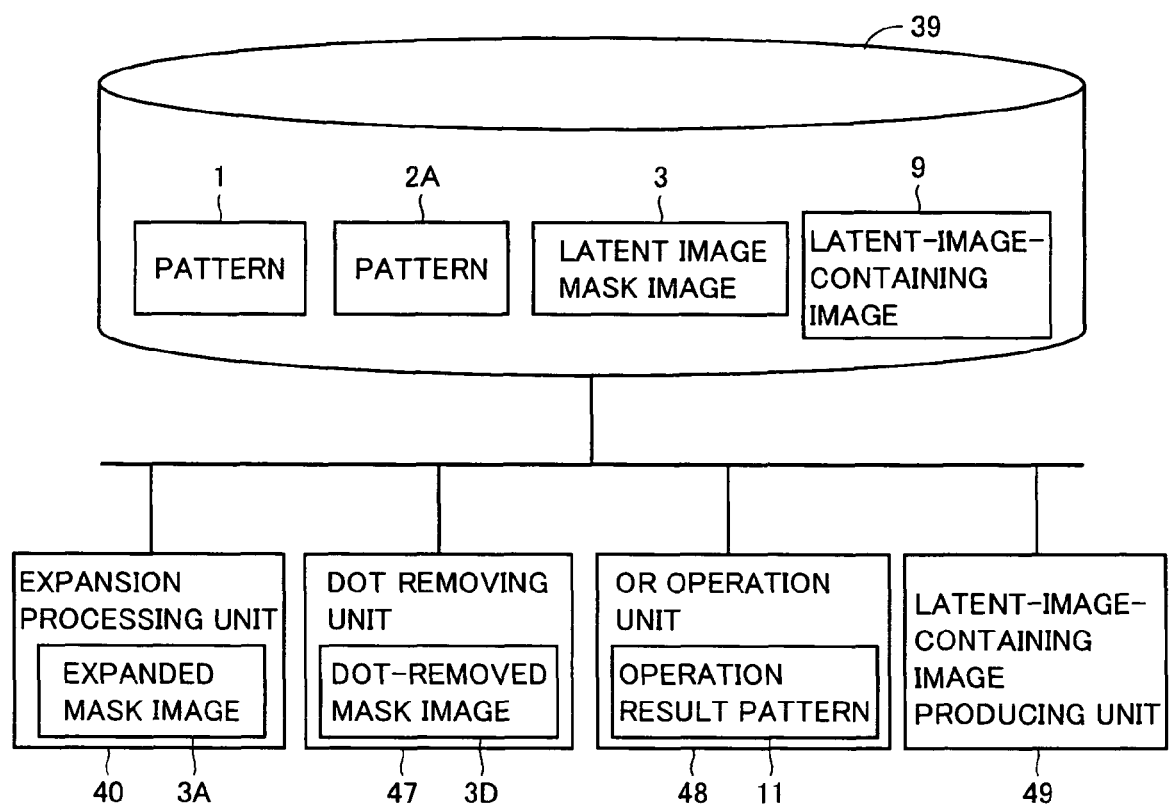
FIG. 18 is a function structure diagram according to a third embodiment of the invention.

A third embodiment will now be described with reference to the drawings.
(Function Structure)
FIG. 18 shows a function structure according to the embodiment. Referring to FIG. 18, the image processing apparatus according to the embodiment includes data storing unit 39, expansion processing unit 40, a dot removing unit 47, an OR operation unit 48 and a latent-image-containing image producing unit 49. Data storing unit 39 prestores patterns 1 and 2A, latent image mask image data 3 and latent-image-containing image data 9 produced by latent-image-containing image producing unit 49. Expansion processing unit 40, dot removing unit 47, OR operation unit 48 and latent-image-containing image producing unit 49 correspond to functions of programs prestored in memory 1424 or fixed disk 1426. CPU 1412 reads and executes the programs to achieve the functions of the respective units. These units may be formed of dedicated circuits.

Figure 19:
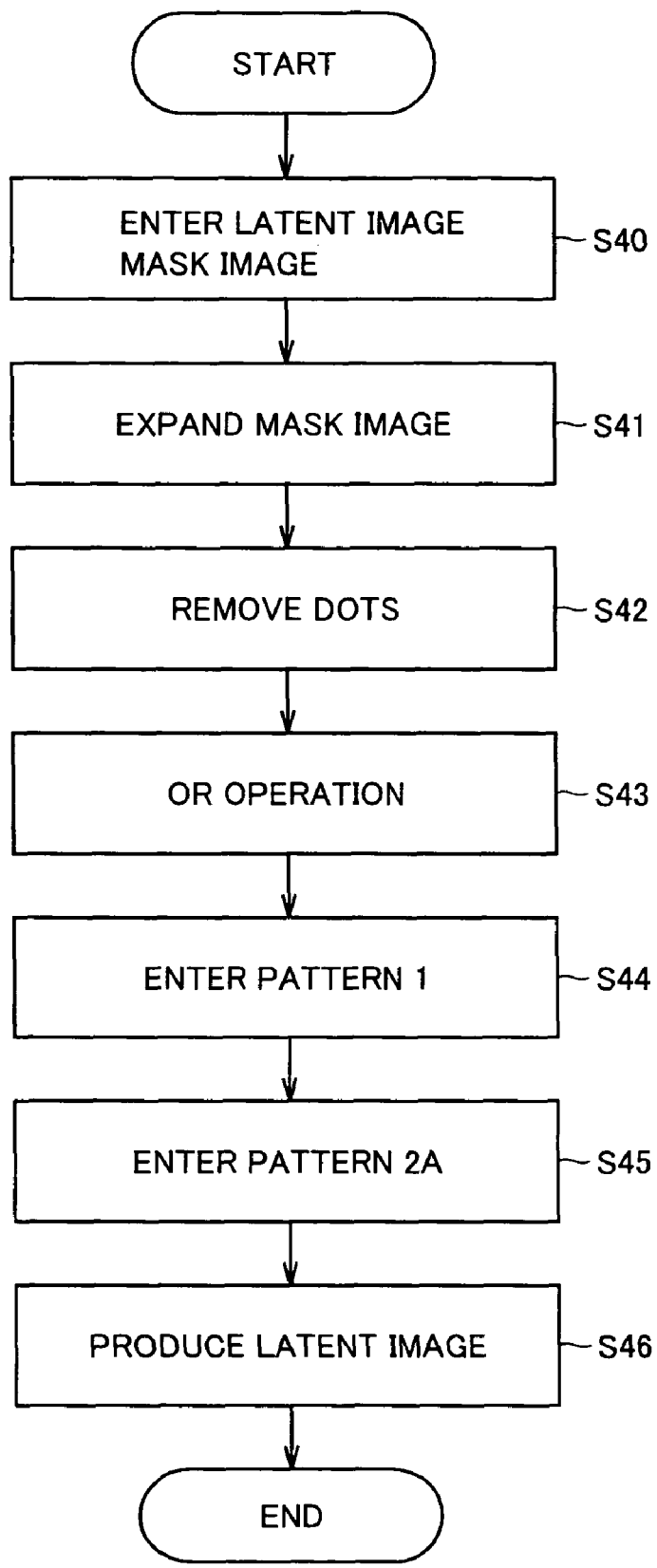
FIG. 19 is a flowchart illustrating a control procedure of a program executed by an image processing apparatus according to a third embodiment.

Patterns 1 and 2A as well as latent image mask image data 3 are the same as those of the second embodiment.
(Processing Procedure)
Referring to FIG. 19, description will now be given on the image processing procedure according to the embodiment.

Expansion processing unit 40 reads latent image mask image data 3 from data storing unit 39 in step S40, and performs the expansion processing on read latent image mask image data 3 to obtain expanded mask image data 3A in step S41.

In step S42, dot removing unit 47 removes dots from the image of expanded mask image data 3A provided from expansion processing unit 40, and thereby obtains dot-removed mask image data 3D. In subsequent step S43, OR operation unit 48 performs the logical OR between a value of each pixel of latent image mask image data 3 read from data storing unit 39 and a value of the corresponding pixel of dot-removed mask image data 3D provided from dot removing unit 47, and thereby combines these data to provide an operation result pattern 11. Latent-image-containing image producing unit 49 reads patterns 1 and 2A from data storing unit 39 in steps S44 and S45, produces latent-image-containing image data 9 in step S46 and stores latent-image-containing image data 9 thus produced in data storing unit 39.

Figure 20A:
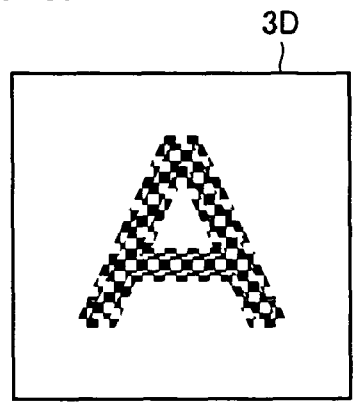
FIGS. 20A-20C illustrate expansion processing and dot-conversion processing.

Referring to FIGS. 9 and 20A, description will now be given on processing in steps S41 and S42. FIG. 9 is an example of mask image data 3. In step S41, the expansion processing is effected several times on mask image data 3 in FIG. 9, and 50% of dots are removed in step S42 to provide mask image data 3D, which is shown in FIG. 20. The expansion processing is the same as that in the first embodiment, and therefore description thereof is not repeated.

It is assumed that dot removing unit 47 removes 50% of dots (i.e., dots of the value of 1) from the image of expanded mask image data 3A (i.e., updates the values of pixels from 1 to 0). Dot removing unit 47 may remove the dots on a random basis, and alternatively may remove the dots uniformly. The "removal of dots" is performed, e.g., by generating random numbers between 0 and 99 for each dot of the image of expanded mask image data 3A, and the pixel is removed when the generated random number is larger than 49 (and otherwise is left). By this processing, the dots can be removed at the rate of 50%.

Figure 20B:
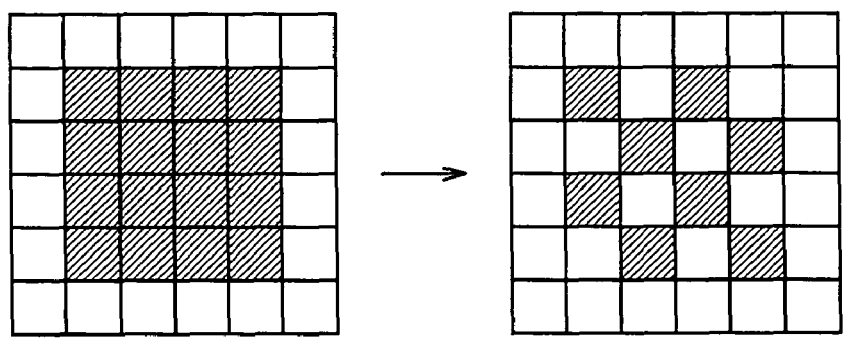

The "uniform removal" represents the following processing. Assuming that the dot matrix is formed of pixels each taking the value of 1, the dots are removed from alternate positions of the dot matrix, e.g., in a checkered fashion as shown in FIG. 20B.

Figure 21:
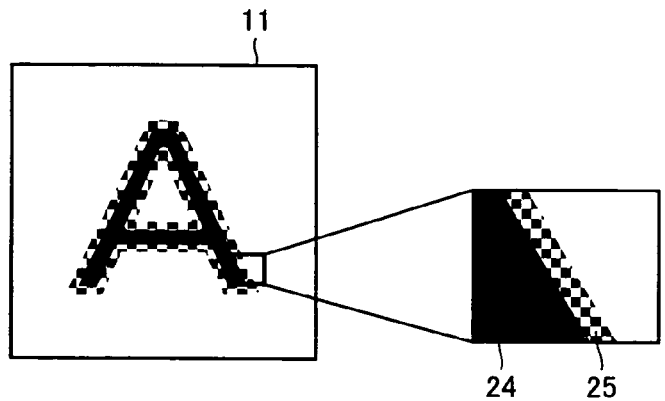
FIG. 21 illustrates a mask image having a contour subjected to dot-conversion processing.

Referring to FIGS. 9, 20A and 21, description will now be given on the logical OR operation processing (step S43) by OR operation unit 48. The logical OR is performed between mask image data 3D in FIG. 20A subjected to the dot removal and original mask image data 3 in FIG. 9 so that operation result pattern data 11 shown in FIG. 21 is obtained. As represented in the operation result pattern data 11, the OR operation can change or convert a contour portion 25 of an image 24 of mask image data 3 into dots.

The manner of the above dot-conversion of the contour portion of the mask image is not restricted to the above, and the dot-conversion may be performed by extracting contour 25 and effecting the dot-conversion on only contour 25.

Figure 22:
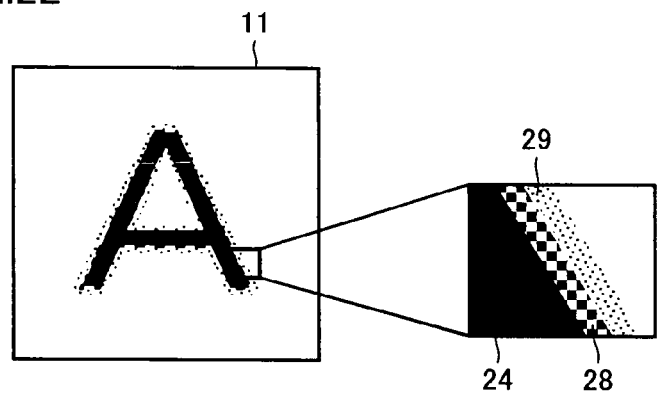
FIG. 22 illustrates a mask image processed to reduce a density as the position moves toward an outer side of the contour.
Figure 23:
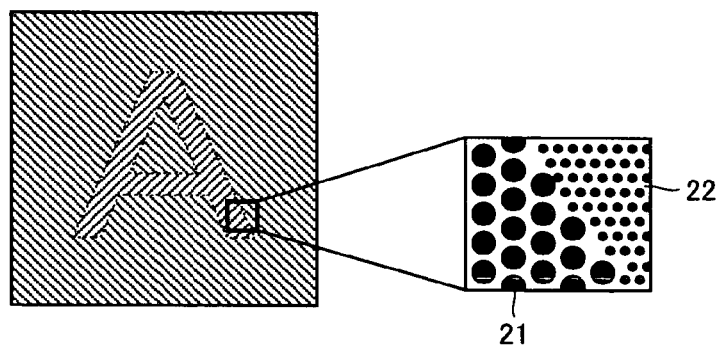
FIG. 23 illustrates a background image containing a latent image formed of coarse and fine patterns.
Figure 24:
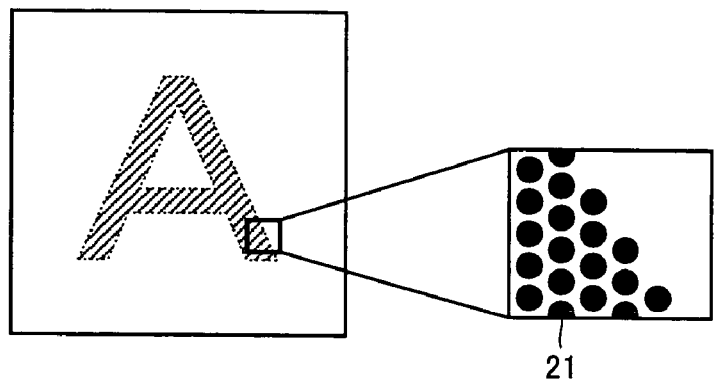
FIG. 24 illustrates a latent image appearing when the background image containing the latent image is copied.

As shown in FIG. 22, the contour of mask image data 3 may be converted to dots 28 and 29 in multiple levels. Thus, OR operations may be performed to combine the mask image data that is prepared by 6-pixel expansion removing 67% of dots, mask image data that is prepared by 3-pixel expansion removing 33% of dots and original mask image data 3. In FIG. 22, the processing is performed such that the density of dots lowers as the position moves toward the outer side of the contour portion of the mask image, and thus the portion located in the background image of the mask image has a lower density of dots (i.e., the degree of dot-conversion is high).

The third embodiment applies gradation to the boundary between patterns 1 and 2A similarly to the second embodiment, and thereby can make the boundary inconspicuous. Although the second embodiment uses the smoothing filter, the third embodiment performs the expansion processing and the dot removal processing so that the processing can be simplified.

Figure 20C:
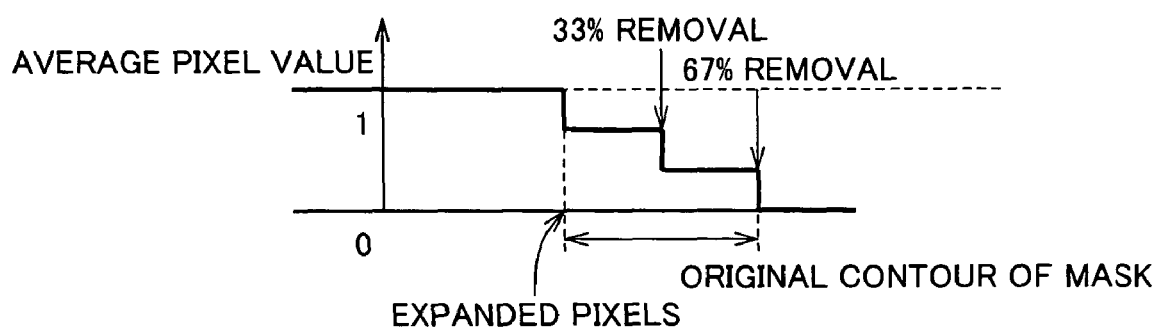

Therefore, the number of pixels to be expanded and the rate of dot removal from the expanded mask image data are determined in advance such that the average pixel value changes in a gentle or gradual stepwise fashion as illustrated in FIG. 20C. When the pixels to be expanded increase, the gradation range becomes wide, and patterns 1 and 2A can be gradually combined. However, if the pixels excessively increase, the edge of the mask image blurs, and the latent image becomes unclear.

For example, when the dot-conversion is to be performed to provide n levels (e.g., three levels in FIG. 20C), it is merely required in a kth level to remove (k/n) of dots, where k satisfies ($1 \leq k < n$).

For removing uniformly by 33%, one dot is removed from three. Also, two dots are removed from three for 67% removal. For random removal, dots are removed at rates of ⅓ and ⅔.

Processing in step S46 is substantially the same as the processing in step S15, and therefore description thereof is not repeated. Since patterns 1 and 2A are combined with reference to the mask image data (operation result pattern 11) subjected to pseudo shading, boundary 26 between patterns 1 and 2A becomes unclear and thus inconspicuous as shown in FIG. 17.

As described above, latent-image-containing image producing unit 49 produces latent-image-containing image data 9 by combining patterns 1 and 2A according to the mask image data (operation result pattern 11) having the dotted contour. Therefore, boundary 26 between patterns 1 and 2A becomes unclear in the image of latent-image-containing image data 9, and the boundary portion can be made inconspicuous without applying the camouflage pattern over it.

For example, therefore, even when the information is embedded in at least one of patterns 1 and 2A, the camouflage pattern does not destroy the whole pattern so that the latent image can be kept inconspicuous while preventing loss of the information.

In each of the foregoing embodiments, the patterns have substantially the same shade level, and thus exhibit the substantially same shade level (when viewed by the naked eye), and patterns 1 and 2 (or 2A) are used as the pattern to be "erased" in the copy-resultant matter and the pattern to be "left" therein, respectively. However, multiple kinds of patterns to be erased or multiple kinds of patterns to be left may be combined in the latent image, which is embedded in the image.

Although the present embodiments have been described and illustrated in detail, it is clearly understood that the same is by way of illustration and example only and is not to be taken by way of limitation, the spirit and scope of the present embodiments being limited only by the terms of the appended claims.

What is claimed is:

1. An image processing apparatus comprising:
a pattern producing unit producing, based on a provided first pattern image, a second pattern image having substantially the same shade level as said first pattern image; and
a latent image producing unit producing an image containing a latent image by selectively combining said first pattern image and produced said second pattern image according to values of respective pixels of a mask image provided for producing said latent image, wherein
said first pattern image is formed of a plurality of information patterns bearing different items of assigned information, the image processing apparatus further comprising:
an image expanding unit effecting expansion processing on provided said first pattern image, and providing said first pattern image subjected to the expansion processing to said pattern producing unit, and wherein
said pattern producing unit converts a basic pattern image to said second pattern image by replacing a value of each of pixels of said basic pattern image prepared in advance with a value of a logical product between the value of said pixel and a value of the corresponding pixel of said first pattern image, wherein
both of said first and second pattern image comprise the background of said image containing a latent image.

2. A printed matter bearing, in a printed fashion, said image containing the latent image and produced by the image processing apparatus according to claim 1.

3. An image processing method for producing an image containing a latent image by combining different kinds of pattern images with a computer having a memory and a processing unit, comprising:
pattern producing for producing a second pattern image having substantially the same shade level as provided in a first pattern image based on said first pattern image; and
latent image producing for causing said processing unit to produce said image containing the latent image by selectively combining said first pattern image and produced said second pattern image according to values of respective pixels of a mask image read from said memory, wherein
said first pattern image is formed of a plurality of information patterns bearing different items of assigned information, the image processing method further comprising:
image expanding for effecting expansion processing on provided said first pattern image, and providing said first pattern image subjected to the expansion processing to said pattern producing, and wherein said pattern producing converts a basic pattern image to said second pattern image by replacing a value of each of pixels of said basic pattern image prepared in advance with a value of a logical product between the value of said pixel and a value of the corresponding pixel of said first pattern image, wherein both of said first and second pattern image comprise the background of said image containing a latent image.

4. A non-transitory machine-readable physical storage medium having tangibly recorded thereon a program for causing a computer to execute the image processing method according to claim 3.

* * * * *